(12) United States Patent
Markus Haynold

(10) Patent No.: US 12,341,698 B2
(45) Date of Patent: Jun. 24, 2025

(54) NETWORK CONGESTION REDUCTION BASED ON ROUTING AND MATCHING DATA PACKETS

(71) Applicant: Chicago Mercantile Exchange Inc., Chicago, IL (US)

(72) Inventor: Oliver Markus Haynold, Evanston, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 0 days.

(21) Appl. No.: 18/489,565

(22) Filed: Oct. 18, 2023

(65) Prior Publication Data

US 2024/0048499 A1 Feb. 8, 2024

Related U.S. Application Data

(63) Continuation of application No. 17/358,171, filed on Jun. 25, 2021, now Pat. No. 11,824,789, which is a
(Continued)

(51) Int. Cl.
*H04L 47/12* (2022.01)
*G06Q 40/04* (2012.01)
(Continued)

(52) U.S. Cl.
CPC ............ *H04L 47/12* (2013.01); *G06Q 40/04* (2013.01); *H04L 12/54* (2013.01);
(Continued)

(58) Field of Classification Search
CPC ..... G06Q 40/04; H04L 12/54; H04L 43/0894; H04L 47/10–127; H04L 47/28; H04L 47/283
See application file for complete search history.

(56) References Cited

U.S. PATENT DOCUMENTS

| 6,016,424 A | 1/2000 | Hicks |
| 6,278,982 B1 | 8/2001 | Korhammer et al. |

(Continued)

FOREIGN PATENT DOCUMENTS

| EP | 1225717 A2 | 7/2002 |
| EP | 1225717 A3 | 1/2006 |

(Continued)

OTHER PUBLICATIONS

"IEX", Wikipedia, Nov. 3, 2016, 4 pages, https://en.wikipedia.org/wiki/IEX.
(Continued)

*Primary Examiner* — Boris D Grijalva Lobos
(74) *Attorney, Agent, or Firm* — Lempia Summerfield Katz LLC

(57) ABSTRACT

A data transaction processing system includes a quarantine system that delays messages configured to accept a delay before being processed by the data transaction processing system. During periods of heavy network traffic, the imposed delay reduces network congestion by distributing/load leveling messages according to available computing resources. Separating messages over time also reduces the processing latency of the data transaction processing system. Messages that are routed and delayed through the quarantine system may be executed at a better transactional value than other non-delayed messages.

20 Claims, 23 Drawing Sheets

Related U.S. Application Data continuation of application No. 15/399,468, filed on Jan. 5, 2017, now Pat. No. 11,082,351.

(51) Int. Cl.
*H04L 12/54* (2022.01)
*H04L 43/0852* (2022.01)
*H04L 43/0894* (2022.01)
*H04L 47/283* (2022.01)
*H04L 47/33* (2022.01)

(52) U.S. Cl.
CPC ...... *H04L 43/0852* (2013.01); *H04L 43/0894* (2013.01); *H04L 47/283* (2013.01); *H04L 47/33* (2013.01)

(56) References Cited

U.S. PATENT DOCUMENTS

| | | | |
|---|---|---|---|
| 6,317,727 | B1 | 11/2001 | May |
| 6,330,589 | B1 | 12/2001 | Kennedy |
| 6,421,653 | B1 | 7/2002 | May |
| 6,625,583 | B1 | 9/2003 | Silverman |
| 6,690,659 | B1 * | 2/2004 | Ahmed ............... H04W 8/04 370/328 |
| 6,996,540 | B1 | 2/2006 | May |
| 7,039,610 | B2 | 5/2006 | Morano et al. |
| 7,127,422 | B1 | 10/2006 | Bundy |
| 7,831,491 | B2 | 11/2010 | Newell et al. |
| 7,844,726 | B2 | 11/2010 | Foygel et al. |
| 7,853,499 | B2 | 12/2010 | Czupek et al. |
| 8,090,641 | B1 | 1/2012 | Monroe |
| 8,484,121 | B2 | 7/2013 | Balabon |
| 2002/0019801 | A1 | 2/2002 | Nakade |
| 2002/0087456 | A1 | 7/2002 | Abeshouse |
| 2003/0093343 | A1 | 5/2003 | Huttenlocher |
| 2003/0236737 | A1 | 12/2003 | Kemp |
| 2004/0059662 | A1 | 3/2004 | Stark |
| 2004/0236669 | A1 | 11/2004 | Horst |
| 2005/0091142 | A1 | 4/2005 | Renton |
| 2005/0096999 | A1 | 5/2005 | Newell et al. |
| 2005/0203826 | A1 | 9/2005 | Farrell et al. |
| 2006/0294228 | A1 | 12/2006 | Almstrom |
| 2008/0243672 | A1 | 10/2008 | Driscoll |
| 2011/0078065 | A1 | 3/2011 | Wingerden |
| 2011/0258108 | A1 | 10/2011 | Brown |
| 2012/0041894 | A1 | 2/2012 | Glodjo et al. |
| 2013/0151391 | A1 | 6/2013 | Simonoff |
| 2014/0006243 | A1 | 1/2014 | Boudreault et al. |
| 2014/0359036 | A1 | 12/2014 | Blakers |
| 2015/0046241 | A1 | 2/2015 | Salmon |
| 2015/0073962 | A1 | 3/2015 | Bixby et al. |
| 2015/0127513 | A1 | 5/2015 | Studnitzer et al. |
| 2015/0127516 | A1 | 5/2015 | Studnitzer et al. |
| 2015/0161727 | A1 | 6/2015 | Callaway et al. |
| 2015/0302441 | A1 | 10/2015 | Katsuyama |
| 2016/0035027 | A1 | 2/2016 | Mercer et al. |
| 2017/0178235 | A1 | 6/2017 | Rooney |
| 2017/0358030 | A1 | 12/2017 | Lutnick |

FOREIGN PATENT DOCUMENTS

| | | | | |
|---|---|---|---|---|
| WO | WO-2011094267 A1 * | 8/2011 | ............. | G06F 3/048 |
| WO | 2014/043420 A1 | 3/2014 | | |

OTHER PUBLICATIONS

"Market Aggregation: Automated and Ultra-Low-Latency Management of Orders in Aggregated Markets", CQG, 2010, 4 pages.
"Server-Side Aggregation", CQG, 2012, 2 pages.
David Cliff et al., "Technology Trends in the Financial Markets: A 2020 Vision", U.K. Government Office of Science, Foresight Project, 2010, 48 pages.
European Examination Report from EP Application No. 17 829 540.8, Mar. 3, 2023, EP.
International Search Report and Written Opinion, from PCT/US2017/067825, Mar. 13, 2018, WO.
Rama Cont et al., "Optimal Order Placement in Limit Order Markets", Oct. 2012, 39 pages.
Rob Daly, "Navigating the Future of Smart Order Routing", DWT, Oct. 5, 1999, 7 pages.
Rony Kay, Ph.D., "Pragmatic Network Latency Engineering Fundamental Facts and Analysis", CTO cPacket Networks, 2009, 31 pages.
Wu et al., "Joint Multi-Radio Multi-Channel Assignment, Scheduling, and Routing in Wireless Mesh Networks", Wireless Netw (2014) 20:11-24, Apr. 27, 2013.

* cited by examiner

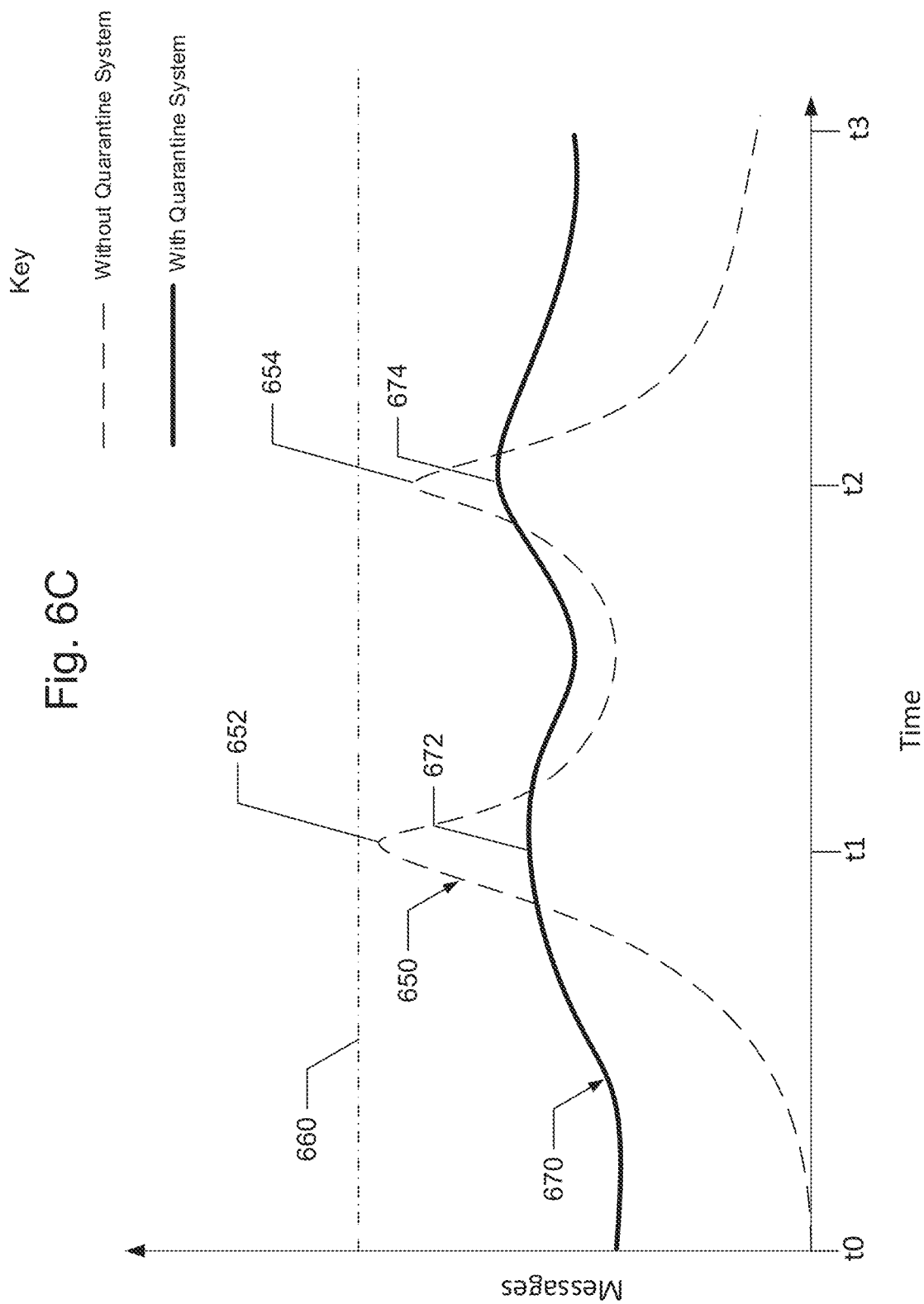

| Object 800 | | |
|---|---|---|
| Position | Bid | Ask |
| 1 | 100 (12) | 101 (30) |
| 2 | 99* (60) | 102 (45) |
| 3 | 98 (26) | 103+ (17) |

Message 802
Sell 99+ (50)

Fig. 8

| Object 800 | | |
|---|---|---|
| Position | Bid | Ask |
| 1 | 100 (12) | 101 (30) |
| 2 | 99* (10) | 102 (45) |
| 3 | 98 (26) | 103+ (17) |

Message 902
Sell 100; 99* (11)

| Position | Object 800 | | Link |
|---|---|---|---|
| | Bid | Ask | |
| 1 | 100 (12) | 99* (11) | Ask position 2 |
| 2 | 99* (10) | 100 (11) | Ask position 1 |
| 3 | 98 (26) | 101 (30) | |
| 4 | | 102 (45) | |
| 5 | | 103+ (17) | |

Fig. 10

| Position | Object 800 | | Link | |
| --- | --- | --- | --- | --- |
| | Bid | Ask | | |
| 1 | 100 (12) | 99* (11) | Ask position 2 | |
| 2 | 99* (10) | 100 (11) | Ask position 1 | Message 1102 |
| 3 | 98 (26) | 101 (30) | | Buy 100 (6) |
| 4 | | 102 (45) | | |
| 5 | | 103+ (17) | | |

Fig. 11

| Object 800 | | | |
|---|---|---|---|
| Position | Bid | Ask | Link |
| 1 | 100 (12) | 99* (5) | Ask position 2 |
| 2 | 99* (10) | 100 (5) | Ask position 1 |
| 3 | 98 (26) | 101 (30) | |
| 4 | | 102 (45) | |
| 5 | | 103+ (17) | |

Fig. 12

| Object 800 | | | |
|---|---|---|---|
| Position | Bid | Ask | Link |
| 1 | 100 (12) | 99* (5) | Ask position 2 |
| 2 | 99* (10) | 100 (5) | Ask position 1 |
| 3 | 98 (26) | 101 (30) | |
| 4 | | 102 (45) | |
| 5 | | 103+ (17) | | t = t0

Message 1302
Buy 99+ (3)

Message 1304
Buy 100 (3)

Fig. 13

| Object 800 | | | |
|---|---|---|---|
| Position | Bid | Ask | Link |
| 1 | 100 (12) | 99* (2) | Ask position 2 |
| 2 | 99* (10) | 100 (2) | Ask position 1 |
| 3 | 98 (26) | 101 (30) | |
| 4 | | 102 (45) | |
| 5 | | 103+ (17) | |

| Message 1302 |
|---|
| Buy 99+ (3) | t = t2

Fig. 15

| Position | Object 800 Bid | Ask |
|---|---|---|
| 1 | 100 (12) | 101 (30) |
| 2 | 99* (10) | 102 (45) |
| 3 | 99+ (1) | 103+ (17) |
| 4 | 98 (26) | | t = t3

Fig. 16

| Object 800 | | |
|---|---|---|
| Position | Bid | Ask |
| 1 | 100 (12) | 101 (30) |
| 2 | 99* (10) | 102 (45) |
| 3 | 99+ (1) | 103+ (17) |
| 4 | 98 (26) | 103 (11) |

Message 1702
Buy 103 (7)

NETWORK CONGESTION REDUCTION BASED ON ROUTING AND MATCHING DATA PACKETS

REFERENCE TO RELATED APPLICATIONS

This application is a continuation under 37 C.F.R. § 1.53(b) of U.S. patent application Ser. No. 17/358,171 filed Jun. 25, 2021, now U.S. Pat. No. 11,824,789, which is a continuation under 37 C.F.R. § 1.53 (b) of U.S. patent application Ser. No. 15/399,468 filed Jan. 5, 2017, now U.S. Pat. No. 11,082,351, the entire disclosures of which are hereby incorporated by reference.

BACKGROUND

A data transaction processing system receives instructions or requests to perform transactions from client computers which may compete for limited transactional opportunities, i.e., to have their transaction requests acted upon before the transaction requests of others. The data transaction processing system may experience processing and/or network latency if the data transaction processing system receives too many requests at, or substantially at, the same time. Client computers submitting requests or orders may attempt to act quickly to increase the likelihood that their requests are accepted. If a client computer does not have a fast connection to the data transaction processing system, the client computer may not be able to submit a transaction request before other client computers and may miss a transacting opportunity or otherwise operate at a disadvantage. Moreover, the requests are typically not uniformly received, but may instead be received by the data transaction processing system in sporadic bursts. Accordingly, the load of a data transaction processing system may vary greatly over time, resulting in unpredictable response times.

BRIEF DESCRIPTION OF THE DRAWINGS

FIG. 6C depicts example plots of incoming messages received by a transaction processor.

FIGS. 8 to 17 illustrate example data structure objects used in accordance with the disclosed embodiments.

DETAILED DESCRIPTION

Figure 1:
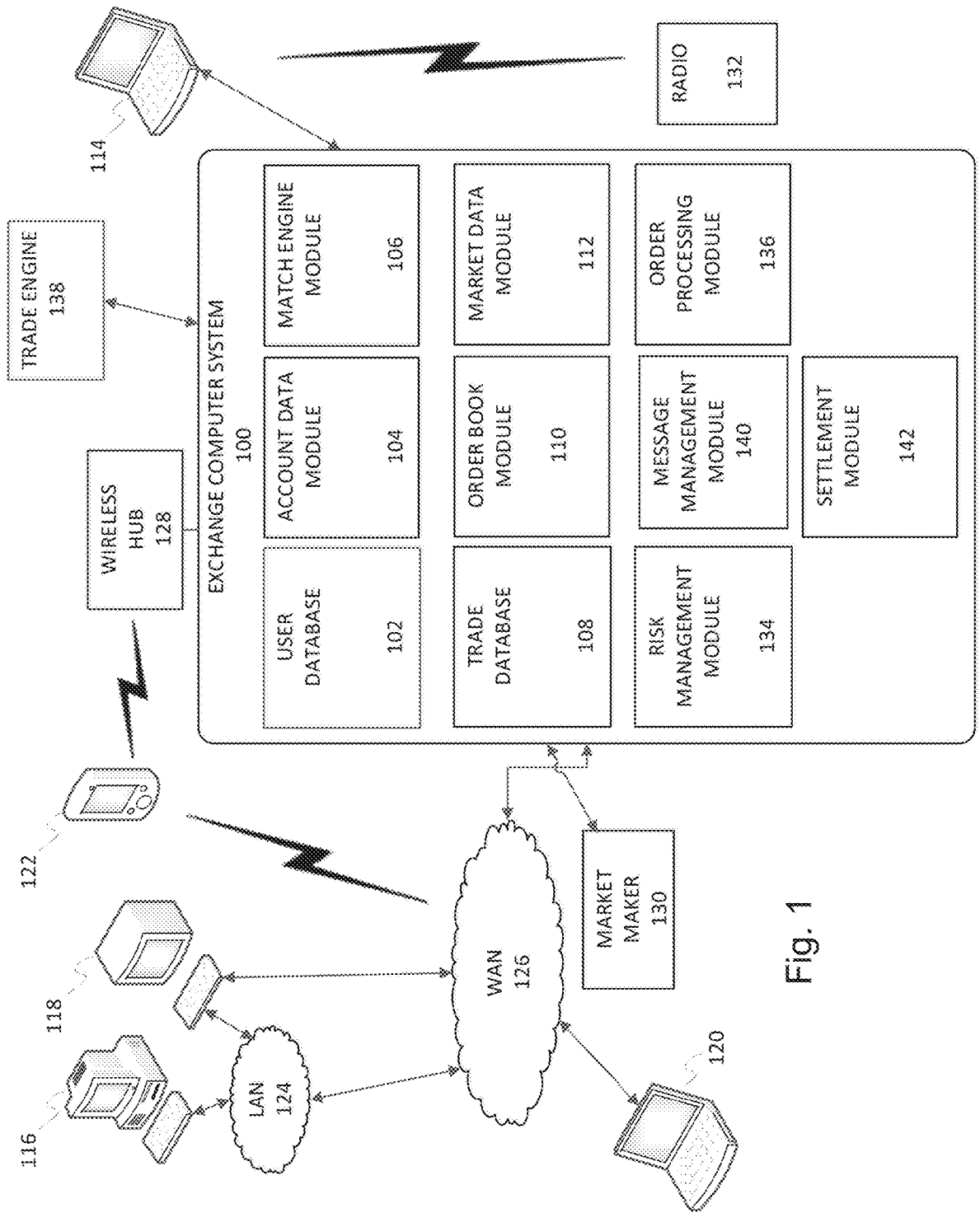
FIG. 1 depicts an illustrative computer network system that may be used to implement aspects of the disclosed embodiments.

The disclosed embodiments relate to a data transaction processing system that reduces network congestion and related processing latencies. Specifically, the disclosed embodiments provide systems and methods for performing transactions upon the occurrence of a delay, while compensating for the delayed transactions by enabling a more efficient/advantageous transaction. The disclosed embodiments enable client computers to submit requests that can match with delayed counter-requests. In a data transaction processing system that receives millions of messages per day, delaying processing of a subset of the messages without disadvantaging the delayed transactions can significantly reduce the overall network congestion experienced by messages being routed to the data transaction processing system. In one embodiment, the disclosed embodiments may implement a specific order type and a specific transaction processor, e.g., hardware matching processor, for processing the order type.

The data transaction processing system, may, in one embodiment, operate in a stateful manner, i.e., depend upon historical/prior messages received, and/or rely upon previous results thereof or previous decisions made, by the transaction processing system. The data transaction processing system may also access data structures storing information about a current environment state to determine if orders match.

The disclosed embodiments may be implemented within a hardware network router that determines whether to route a received message to a transaction processor, or whether to hold/store a received message and delay forwarding.

The disclosed embodiments improve upon the technical field of networking by reducing network congestion of messages transmitted to a transaction processor. The disclosed system is a specific implementation and practical application that allows a network router or a transaction processor to delay forwarding or processing of a message based on the message contents and characteristics. The disclosed embodiments also improve bandwidth utilization by allowing a data transaction processing system to manage and spread transactions over time, temper high volume periods by shifting delayable transactions to lower volume periods, and/or level or otherwise equalize load over time. The disclosed embodiments also incentivize submission of a delayable transaction by providing better execution (e.g., at a more favorable value) for some delayed transactions.

At least some of the problems solved by the disclosed encoding system are specifically rooted in technology, specifically in data communications where the messages transmitted over a network to a transaction processor can be dropped/lost or significantly delayed due to network congestion, and are solved by means of a technical solution, namely, enabling orders/requests to be marked as delayed in exchange for a more efficient or more desirable transaction execution. The disclosed embodiments solve a communications network-centric problem of sending large amounts of messages all configured to be executed/processed immediately upon receipt. Accordingly, the resulting problem is a problem arising in computer systems due to the high volume of disparate messages processed by an exchange computing system. The solutions disclosed herein are, in one embodiment, implemented as automatic responses and actions by an exchange computing system computer.

The disclosed embodiments may be directed to an exchange computing system that includes multiple hardware matching processors that match, or attempt to match, electronic data transaction request messages with other electronic data transaction request messages counter thereto. Incoming electronic data transaction request messages may be received from different client computers over a data communication network, and output electronic data transaction result messages may be transmitted to the client computers and may be indicative of results of the attempts to match incoming electronic data transaction request messages.

The disclosed embodiments may be implemented in a data transaction processing system that processes data items or objects. Customer or user devices (e.g., computers) may submit electronic data transaction request messages, e.g., inbound messages, to the data transaction processing system over a data communication network. The electronic data transaction request messages may include, for example, transaction matching parameters, such as instructions and/or values, for processing the data transaction request messages within the data transaction processing system. The instructions may be to perform transactions, e.g., buy or sell a quantity of a product at a given value. Products, e.g., financial instruments, or order books representing the state of an electronic marketplace for a product, may be represented as data objects within the exchange computing system. The instructions may also be conditional, e.g., buy or sell a quantity of a product at a given value if a trade for the product is executed at some other reference value. The data transaction processing system may include various specifically configured matching processors that match, e.g., automatically, electronic data transaction request messages for the same one of the data items. The specifically configured matching processors may match, or attempt to match, electronic data transaction request messages based on multiple transaction matching parameters from the different client computers. The specifically configured matching processors may additionally generate information indicative of a state of an environment (e.g., the state of the order book) based on the processing and report this information to data recipient computing systems via outbound messages published via one or more data feeds.

For example, the ordinary and common function of transaction processing systems, e.g., matching systems, with an exchange computing system may be to match, or attempt to match, counter-pairs of offers as quickly as possible. Typical match engines match counter-pairs of offers continuously and in real time, as quickly as possible, upon detecting that the offers can match. The particular implementation of the disclosed quarantine system differs drastically from typical exchange computing matching systems by delaying, in a specific manner, incoming messages that are configured to accept a delay, which may be a random delay imposed by a network router, delaying in turn a match that would have otherwise occurred earlier between the incoming message and a message counter thereto. In one embodiment, if the incoming order is delayed, and if the resting order (with which the incoming message would have otherwise matched) remains on the book for the duration of the delay, the incoming order may match with the resting order upon expiration of the delay period. Thus, the disclosed quarantine system may introduce discontinuities or disruptions, e.g., temporal shifts or discontinuities, to the otherwise continuous matching process.

In other words, pairs of orders that appear to be matching counteroffers or counterparts of each other may be delayed from matching, which may allow intervening orders to match (with resting orders) instead. The disclosed embodiments also execute a transaction, or match two messages, at a different value based on whether a message accepted a delay. Common exchange computing systems fail to provide any mechanism for electing to accept a delay, and then imposing a delay on a message. Common exchange computing systems also fail to match messages at different values based on whether a message accepted, and/or experienced, a delay. In contrast, the disclosed quarantine system enables messages to specify whether they accept a delay, imposes a delay, and/or matches messages at different values based on whether a message accepted and/or experienced a delay.

The quarantine system is more discriminatory in its application over typical matching computing systems, resulting in subsets of messages having lower speed requirements and immediate processing requirements than other messages, thereby enabling the exchange computing system to reduce the number of messages received and processed concurrently, or substantially concurrently, thereby reducing network congestion and processing latency. Even though transaction processing systems are designed and intended to process transactions as quickly as possible, the disclosed quarantine system is a specific implementation which provides useful and unexpected results by selectively delaying the core function of transaction processing systems in specific cases, namely, where a message is self-de-prioritized. The quarantine system may result in some of the non-delayed messages experiencing a lower transaction processor latency because other messages that would have otherwise been processed ahead of or concurrently therewith are subjected to a delay, i.e., they are processed at a later time. The quarantine system accordingly increases the processing speed and throughput of a transaction processor.

For example, one exemplary environment where efficient network utilization and routing is desirable is in financial markets, and in particular, electronic financial exchanges, such as a futures exchange, such as the Chicago Mercantile Exchange Inc. (CME).

A financial instrument trading system, such as a futures exchange, such as the Chicago Mercantile Exchange Inc. (CME), provides a contract market where financial instruments, e.g., futures and options on futures, are traded using electronic systems. "Futures" is a term used to designate all contracts for the purchase or sale of financial instruments or physical commodities for future delivery or cash settlement on a commodity futures exchange. A futures contract is a legally binding agreement to buy or sell a commodity at a specified price at a predetermined future time. An option contract is the right, but not the obligation, to sell or buy the underlying instrument (in this case, a futures contract) at a specified price within a specified time. The commodity to be delivered in fulfillment of the contract, or alternatively the commodity for which the cash market price shall determine the final settlement price of the futures contract, is known as the contract's underlying reference or "underlier." The terms and conditions of each futures contract are standardized as to the specification of the contract's underlying reference commodity, the quality of such commodity, quantity, delivery date, and means of contract settlement. Cash settlement is a method of settling a futures contract whereby the parties effect final settlement when the contract expires by paying/ receiving the loss/gain related to the contract in cash, rather than by effecting physical sale and purchase of the underlying reference commodity at a price determined by the futures contract, price. Options and futures may be based on more generalized market indicators, such as stock indices, interest rates, futures contracts, and other derivatives.

An exchange may provide for a centralized "clearing house" through which trades made must be confirmed, matched, and settled each day until offset or delivered. The clearing house may be an adjunct to an exchange, and may be an operating division of an exchange, which is responsible for settling trading accounts, clearing trades, collecting, and maintaining performance bond funds, regulating delivery, and reporting trading data. One of the roles of the clearing house is to mitigate credit risk. Clearing is the procedure through which the clearing house becomes buyer to each seller of a futures contract, and seller to each buyer, also referred to as a novation, and assumes responsibility for protecting buyers and sellers from financial loss due to breach of contract, by assuring performance on each contract. A clearing member is a firm qualified to clear trades through the clearing house.

An exchange computing system may operate under a central counterparty model, where the exchange acts as an intermediary between market participants for the transaction of financial instruments. In particular, the exchange computing system novates itself into the transactions between the market participants, i.e., splits a given transaction between the parties into two separate transactions where the exchange computing system substitutes itself as the counterparty to each of the parties for that part of the transaction, sometimes referred to as a novation. In this way, the exchange computing system acts as a guarantor and central counterparty and there is no need for the market participants to disclose their identities to each other, or subject themselves to credit or other investigations by a potential counterparty. For example, the exchange computing system insulates one market participant from the default by another market participant. Market participants need only meet the requirements of the exchange computing system. Anonymity among the market participants encourages a more liquid market environment as there are lower barriers to participation. The exchange computing system can accordingly offer benefits such as centralized and anonymous matching and clearing.

A match engine within a financial instrument trading system may comprise a transaction processing system that processes a high volume, e.g., millions, of messages or orders in one day. The messages are typically submitted from market participant computers. Exchange match engine systems may be subject to variable messaging loads due to variable market messaging activity. Performance of a match engine depends to a certain extent on the magnitude of the messaging load and the work needed to process that message at any given time. An exchange match engine may process large numbers of messages during times of high volume messaging activity. With limited processing capacity, high messaging volumes may increase the response time or latency experienced by market participants.

The disclosed embodiments recognize that electronic messages such as incoming messages from market participants, i.e., "outright" messages, e.g., trade order messages, etc., are sent from client devices associated with market participants, or their representatives, to an electronic trading or market system. For example, a market participant may submit an electronic message to the electronic trading system that includes an associated specific action to be undertaken by the electronic trading system, such as entering a new trade order into the market or modifying an existing order in the market. In one embodiment, if a participant wishes to modify a previously sent request, e.g., a prior order which has not yet been processed or traded, they may send a request message comprising a request to modify the prior request.

As used herein, a financial message, or an electronic message, refers both to messages communicated by market participants to an electronic trading or market system and vice versa. The messages may be communicated using packeting or other techniques operable to communicate information between systems and system components. Some messages may be associated with actions to be taken in the electronic trading or market system.

Financial messages communicated to the electronic trading system, also referred to as "inbound" messages, may include associated actions that characterize the messages, such as trader orders, order modifications, order cancelations and the like, as well as other message types. Inbound messages may be sent from market participants, or their representatives, e.g., trade order messages, etc., to an electronic trading or market system. For example, a market participant may submit an electronic message to the electronic trading system that includes an associated specific action to be undertaken by the electronic trading system, such as entering a new trade order into the market or modifying an existing order in the market. In one exemplary embodiment, the incoming request itself, e.g., the inbound order entry, may be referred to as an iLink message. iLink is a bidirectional communications/message protocol/message format implemented by the Chicago Mercantile Exchange Inc.

Financial messages communicated from the electronic trading system, referred to as "outbound" messages, may include messages responsive to inbound messages, such as confirmation messages, or other messages such as market update messages, quote messages, and the like. Outbound messages may be disseminated via data feeds.

Financial messages may further be categorized as having or reflecting an impact on a market or electronic marketplace, also referred to as an "order book" or "book," for a traded product, such as a prevailing price therefore, number of resting orders at various price levels and quantities thereof, etc., or not having or reflecting an impact on a market or a subset or portion thereof. In one embodiment, an electronic order book may be understood to be an electronic collection of the outstanding or resting orders for a financial instrument.

For example, a request to place a trade may result in a response indicative of the trade either being matched with, or being rested on an order book to await, a suitable counter-order. This response may include a message directed solely to the trader who submitted the order to acknowledge receipt of the order and report whether it was matched, and the extent thereto, or rested. The response may further include a message to all market participants reporting a change in the order book due to the order. This response may take the form of a report of the specific change to the order book, e.g., an order for quantity X at price Y was added to the book (referred to, in one embodiment, as a Market By Order message), or may simply report the result, e.g., price level Y now has orders for a total quantity of Z (where Z is the sum of the previous resting quantity plus quantity X of the new order). In some cases, requests may elicit a non-impacting response, such as temporally proximate to the receipt of the request, and then cause a separate market-impact reflecting response at a later time. For example, a stop order, fill or kill order, also known as an immediate or cancel order, or other conditional request may not have an immediate market impacting effect, if at all, until the requisite conditions are met.

An acknowledgement or confirmation of receipt, e.g., a non-market impacting communication, may be sent to the trader simply confirming that the order was received. Upon the conditions being met and a market impacting result thereof occurring, a market-impacting message may be transmitted as described herein both directly back to the submitting market participant and to all market participants (in a Market By Price "MBP" e.g., Aggregated By Value ("ABV") book, or Market By Order "MBO", e.g., Per Order ("PO") book format). It should be appreciated that additional conditions may be specified, such as a time or price limit, which may cause the order to be dropped or otherwise canceled and that such an event may result in another non-market-impacting communication instead. In some implementations, market impacting communications may be communicated separately from non-market impacting communications, such as via a separate communications channel or feed.

It should be further appreciated that various types of market data feeds may be provided which reflect different markets or aspects thereof. Market participants may then, for example, subscribe to receive those feeds of interest to them. For example, data recipient computing systems may choose to receive one or more different feeds. As market impacting communications usually tend to be more important to market participants than non-impacting communications, this separation may reduce congestion and/or noise among those communications having or reflecting an impact on a market or portion thereof. Furthermore, a particular market data feed may only communicate information related to the top buy/sell prices for a particular product, referred to as "top of book" feed, e.g., only changes to the top 10 price levels are communicated. Such limitations may be implemented to reduce consumption of bandwidth and message generation resources. In this case, while a request message may be considered market-impacting if it affects a price level other than the top buy/sell prices, it will not result in a message being sent to the market participants.

Examples of the various types of market data feeds which may be provided by electronic trading systems, such as the CME, in order to provide different types or subsets of market information or to provide such information in different formats include Market By Order or Per Order, Market Depth (also known as Market by Price or Aggregated By Value to a designated depth of the book), e.g., CME offers a 10-deep market by price feed, Top of Book (a single depth Market by Price feed), and combinations thereof. There may also be all manner of specialized feeds in terms of the content, i.e., providing, for example, derived data, such as a calculated index.

Market data feeds may be characterized as providing a "view" or "overview" of a given market, an aggregation, or a portion thereof or changes thereto. For example, a market data feed, such as a Market By Price ("MBP") feed, also known as an Aggregated By Value ("ABV") feed, may convey, with each message, the entire/current state of a market, or portion thereof, for a particular product as a result of one or more market impacting events. For example, an MBP message may convey a total quantity of resting buy/sell orders at a particular price level in response to a new order being placed at that price. An MBP message may convey a quantity of an instrument which was traded in response to an incoming order being matched with one or more resting orders. MBP messages may only be generated for events affecting a portion of a market, e.g., only the top 10 resting buy/sell orders and, thereby, only provide a view of that portion. As used herein, a market impacting request may be said to impact the "view" of the market as presented via the market data feed.

An MBP feed may utilize different message formats for conveying different types of market impacting events. For example, when a new order is rested on the order book, an MBP message may reflect the current state of the price level to which the order was added, e.g., the new aggregate quantity and the new aggregate number of resting orders. As can be seen, such a message conveys no information about the individual resting orders, including the newly rested order, themselves to the market participants. Only the submitting market participant, who receives a separate private message acknowledging the event, knows that it was their order that was added to the book. Similarly, when a trade occurs, an MBP message may be sent which conveys the price at which the instrument was traded, the quantity traded and the number of participating orders, but may convey no information as to whose particular orders contributed to the trade. MBP feeds may further batch reporting of multiple events, i.e., report the result of multiple market impacting events in a single message.

Alternatively, a market data feed, referred to as a Market By Order ("MBO") feed also known as a Per Order ("PO") feed, may convey data reflecting a change that occurred to the order book rather than the result of that change, e.g., that order ABC for quantity X was added to price level Y or that order ABC and order XYZ traded a quantity X at a price Y. In this case, the MBO message identifies only the change that occurred so a market participant wishing to know the current state of the order book must maintain their own copy and apply the change reflected in the message to know the current state. As can be seen, MBO/PO messages may carry much more data than MBP/ABV messages because MBO/PO messages reflect information about each order, whereas MBP/ABV messages contain information about orders affecting some predetermined value levels. Furthermore, because specific orders, but not the submitting traders thereof, are identified, other market participants may be able to follow that order as it progresses through the market, e.g., as it is modified, canceled, traded, etc.

An ABV book data object may include information about multiple values. The ABV book data object may be arranged and structured so that information about each value is aggregated together. Thus, for a given value V, the ABV book data object may aggregate all the information by value, such as for example, the number of orders having a certain position at value V, the quantity of total orders resting at value V, etc. Thus, the value field may be the key, or may be a unique field, within an ABV book data object. In one embodiment, the value for each entry within the ABV book data object is different. In one embodiment, information in an ABV book data object is presented in a manner such that the value field is the most granular field of information.

A PO book data object may include information about multiple orders. The PO book data object may be arranged and structured so that information about each order is represented. Thus, for a given order O, the PO book data object may provide all of the information for order O. Thus, the order field may be the key, or may be a unique field, within a PO book data object. In one embodiment, the order ID for each entry within the PO book data object is different.

In one embodiment, information in a PO book data object is presented in a manner such that the order field is the most granular field of information.

Thus, the PO book data object may include data about unique orders, e.g., all unique resting orders for a product, and the ABV book data object may include data about unique values, e.g., up to a predetermined level, e.g., top ten price or value levels, for a product.

It should be appreciated that the number, type and manner of market data feeds provided by an electronic trading system are implementation dependent and may vary depending upon the types of products traded by the electronic trading system, customer/trader preferences, bandwidth and data processing limitations, etc. and that all such feeds, now available or later developed, are contemplated herein. MBP/ABV and MBO/PO feeds may refer to categories/variations of market data feeds, distinguished by whether they provide an indication of the current state of a market resulting from a market impacting event (MBP) or an indication of the change in the current state of a market due to a market impacting event (MBO).

Messages, whether MBO or MBP, generated responsive to market impacting events which are caused by a single order, such as a new order, an order cancelation, an order modification, etc., are fairly simple and compact and easily created and transmitted. However, messages, whether MBO or MBP, generated responsive to market impacting events which are caused by more than one order, such as a trade, may require the transmission of a significant amount of data to convey the requisite information to the market participants. For trades involving a large number of orders, e.g., a buy order for a quantity of 5000 which matches 5000 sell orders each for a quantity of 1, a significant amount of information may need to be sent, e.g., data indicative of each of the 5000 trades that have participated in the market impacting event.

In one embodiment, an exchange computing system may generate multiple order book objects, one for each type of view that is published or provided. For example, the system may generate a PO book object and an ABV book object. It should be appreciated that each book object, or view for a product or market, may be derived from the Per Order book object, which includes all the orders for a given financial product or market.

An inbound message may include an order that affects the PO book object, the ABV book object, or both. An outbound message may include data from one or more of the structures within the exchange computing system, e.g., the PO book object queues or the ABV book object queues.

Furthermore, each participating trader needs to receive a notification that their particular order has traded. Continuing with the example, this may require sending 5001 individual trade notification messages, or even 10,000+ messages where each contributing side (buy vs. sell) is separately reported, in addition to the notification sent to all of the market participants.

As detailed in U.S. patent application Ser. No. 14/100,788, the entirety of which is incorporated by reference herein and relied upon, it may be recognized that trade notifications sent to all market participants may include redundant information repeated for each participating trade and a structure of an MBP trade notification message may be provided which results in a more efficient communication of the occurrence of a trade. The message structure may include a header portion which indicates the type of transaction which occurred, i.e., a trade, as well as other general information about the event, an instrument portion which comprises data about each instrument which was traded as part of the transaction, and an order portion which comprises data about each participating order. In one embodiment, the header portion may include a message type, Transaction Time, Match Event Indicator, and Number of Market Data Entries ("No. MD Entries") fields. The instrument portion may include a market data update action indicator ("MD Update Action"), an indication of the Market Data Entry Type ("MD Entry Type"), an identifier of the instrument/security involved in the transaction ("Security ID"), a report sequence indicator ("Rpt Seq"), the price at which the instrument was traded ("MD Entry PX"), the aggregate quantity traded at the indicated price ("ConsTradeQty"), the number of participating orders ("NumberOfOrders"), and an identifier of the aggressor side ("Aggressor Side") fields. The order portion may further include an identifier of the participating order ("Order ID"), described in more detail below, and the quantity of the order traded ("MD Entry Size") fields. It should be appreciated that the particular fields included in each portion are implementation dependent and that different fields in addition to, or in lieu of, those listed may be included depending upon the implementation. It should be appreciated that the exemplary fields can be compliant with the FIX binary and/or FIX/FAST protocol for the communication of the financial information.

The instrument portion contains a set of fields, e.g., seven fields accounting for 23 bytes, which are repeated for each participating instrument. In complex trades, such as trades involving combination orders or strategies, e.g., spreads, or implied trades, there may be multiple instruments being exchanged among the parties. In one embodiment, the order portion includes only one field, accounting for 4 bytes, for each participating order which indicates the quantity of that order which was traded. As will be discussed below, the order portion may further include an identifier of each order, accounting for an additional 8 bytes, in addition to the quantity thereof traded. As should be appreciated, data which would have been repeated for each participating order, is consolidated, or otherwise summarized in the header and instrument portions of the message thereby eliminating redundant information and, overall, significantly reducing the size of the message.

While the disclosed embodiments will be discussed with respect to an MBP market data feed, it should be appreciated that the disclosed embodiments may also be applicable to an MBO market data feed.

In one embodiment, the disclosed system may include a Market Segment Gateway ("MSG") that is the point of ingress/entry and/or egress/departure for all transactions, i.e., the network traffic/packets containing the data therefore, specific to a single market at which the order of receipt of those transactions may be ascribed. An MSG or Market Segment Gateway may be utilized for the purpose of deterministic operation of the market. The electronic trading system may include multiple markets, and because the electronic trading system includes one MSG for each market/product implemented thereby, the electronic trading system may include multiple MSGs. For more detail on deterministic operation in a trading system, see U.S. patent application Ser. No. 14/074,667 entitled "Transactionally Deterministic High Speed Financial Exchange Having Improved, Efficiency, Communication, Customization, Performance, Access, Trading Opportunities, Credit Controls, And Fault Tolerance" and filed on Nov. 7, 2013, the entire disclosure of which is incorporated by reference herein and relied upon.

For example, a participant may send a request for a new transaction, e.g., a request for a new order, to the MSG. The MSG extracts or decodes the request message and determines the characteristics of the request message.

The MSG may include, or otherwise be coupled with, a buffer, cache, memory, database, content addressable memory, data store or other data storage mechanism, or combinations thereof, which stores data indicative of the characteristics of the request message. The request is passed to the transaction processing system, e.g., the match engine.

An MSG or Market Segment Gateway may be utilized for the purpose of deterministic operation of the market. Transactions for a particular market may be ultimately received at the electronic trading system via one or more points of entry, e.g., one or more communications interfaces, at which the disclosed embodiments apply determinism, which as described may be at the point where matching occurs, e.g., at each match engine (where there may be multiple match engines, each for a given product/market, or moved away from the point where matching occurs and closer to the point where the electronic trading system first becomes "aware" of the incoming transaction, such as the point where transaction messages, e.g., orders, ingress the electronic trading system. Generally, the terms "determinism" or "transactional determinism" may refer to the processing, or the appearance thereof, of orders in accordance with defined business rules. Accordingly, as used herein, the point of determinism may be the point at which the electronic trading system ascribes an ordering to incoming transactions/orders relative to other incoming transactions/orders such that the ordering may be factored into the subsequent processing, e.g., matching, of those transactions/orders as will be described. For more detail on deterministic operation in a trading system, see U.S. patent application Ser. No. 14/074,675, filed on Nov. 7, 2013, published as U.S. Patent Publication No. 2015/0127516 ("the '516 Publication"), entitled "Transactionally Deterministic High Speed Financial Exchange Having Improved, Efficiency, Communication, Customization, Performance, Access, Trading Opportunities, Credit Controls, And Fault Tolerance", the entirety of which is incorporated by reference herein and relied upon.

Electronic trading of financial instruments, such as futures contracts, is conducted by market participants sending orders, such as to buy or sell one or more futures contracts, in electronic form to the exchange. These electronically submitted orders to buy and sell are then matched, if possible, by the exchange, i.e., by the exchange's matching engine, to execute a trade. Outstanding (unmatched, wholly unsatisfied/unfilled or partially satisfied/filled) orders are maintained in one or more data structures or databases referred to as "order books," such orders being referred to as "resting," and made visible, i.e., their availability for trading is advertised, to the market participants through electronic notifications/broadcasts, referred to as market data feeds. An order book is typically maintained for each product, e.g., instrument, traded on the electronic trading system and generally defines or otherwise represents the state of the market for that product, i.e., the current prices at which the market participants are willing buy or sell that product. As such, as used herein, an order book for a product may also be referred to as a market for that product.

Upon receipt of an incoming order to trade in a particular financial instrument, whether for a single-component financial instrument, e.g., a single futures contract, or for a multiple-component financial instrument, e.g., a combination contract such as a spread contract, a match engine, as described herein, will attempt to identify a previously received but unsatisfied order counter thereto, i.e., for the opposite transaction (buy or sell) in the same financial instrument at the same or better price (but not necessarily for the same quantity unless, for example, either order specifies a condition that it must be entirely filled or not at all).

Previously received but unsatisfied orders, i.e., orders which either did not match with a counter order when they were received or their quantity was only partially satisfied, referred to as a partial fill, are maintained by the electronic trading system in an order book database/data structure to await the subsequent arrival of matching orders or the occurrence of other conditions which may cause the order to be modified or otherwise removed from the order book.

If the match engine identifies one or more suitable previously received but unsatisfied counter orders, they, and the incoming order, are matched to execute a trade there between to satisfy the quantities of at least partially one or both the incoming order or the identified orders. If there remains any residual unsatisfied quantity of the identified one or more orders, those orders are left on the order book with their remaining quantity to await a subsequent suitable counter order, i.e., to rest. If the match engine does not identify a suitable previously received but unsatisfied counter order, or the one or more identified suitable previously received but unsatisfied counter orders are for a lesser quantity than the incoming order, the incoming order is placed on the order book, referred to as "resting", with original or remaining unsatisfied quantity, to await a subsequently received suitable order counter thereto. The match engine then generates match event data reflecting the result of this matching process. Other components of the electronic trading system, as will be described, then generate the respective order acknowledgment and market data messages and transmit those messages to the market participants.

Matching, which is a function typically performed by the exchange, is a process, for a given order which specifies a desire to buy or sell a quantity of a particular instrument at a particular price, of seeking/identifying one or more wholly or partially, with respect to quantity, satisfying counter orders thereto, e.g., a sell counter to an order to buy, or vice versa, for the same instrument at the same, or sometimes better, price (but not necessarily the same quantity), which are then paired for execution to complete a trade between the respective market participants (via the exchange) and at least partially satisfy the desired quantity of one or both of the order and/or the counter order, with any residual unsatisfied quantity left to await another suitable counter order, referred to as "resting." A match event may occur, for example, when an aggressing order matches with a resting order. In one embodiment, two orders match because one order includes instructions for or specifies buying a quantity of a particular instrument at a particular price, and the other order includes instructions for or specifies selling a (different or same) quantity of the instrument at a same or better price. It should be appreciated that performing an instruction associated with a message may include attempting to perform the instruction. Whether or not an exchange computing system is able to successfully perform an instruction may depend on the state of the electronic marketplace.

While the disclosed embodiments will be described with respect to a product by product or market by market implementation, e.g., implemented for each market/order book, it will be appreciated that the disclosed embodiments may be implemented so as to apply across markets for multiple products traded on one or more electronic trading systems, such as by monitoring an aggregate, correlated or other derivation of the relevant indicative parameters as described herein.

While the disclosed embodiments may be discussed in relation to futures and/or options on futures trading, it should be appreciated that the disclosed embodiments may be applicable to any equity, fixed income security, currency, commodity, options or futures trading system or market now available or later developed. It should be appreciated that a trading environment, such as a futures exchange as described herein, implements one or more economic markets where rights and obligations may be traded. As such, a trading environment may be characterized by a need to maintain market integrity, transparency, predictability, fair/equitable access, and participant expectations with respect thereto. In addition, it should be appreciated that electronic trading systems further impose additional expectations and demands by market participants as to transaction processing speed, latency, capacity, and response time, while creating additional complexities relating thereto. Accordingly, as will be described, the disclosed embodiments may further include functionality to ensure that the expectations of market participants are met, e.g., that transactional integrity and predictable system responses are maintained.

Financial instrument trading systems allow traders to submit orders and receive confirmations, market data, and other information electronically via electronic messages exchanged using a network. Electronic trading systems ideally attempt to offer a more efficient, fair and balanced market where market prices reflect a true consensus of the value of traded products among the market participants, where the intentional or unintentional influence of any one market participant is minimized if not eliminated, and where unfair or inequitable advantages with respect to information access are minimized if not eliminated.

Electronic marketplaces attempt to achieve these goals by using electronic messages to communicate actions and related data of the electronic marketplace between market participants, clearing firms, clearing houses, and other parties. The messages can be received using an electronic trading system, wherein an action or transaction associated with the messages may be executed. For example, the message may contain information relating to an order to buy or sell a product in a particular electronic marketplace, and the action associated with the message may indicate that the order is to be placed in the electronic marketplace such that other orders which were previously placed may potentially be matched to the order of the received message. Thus, the electronic marketplace may conduct market activities through electronic systems.

The clearing house of an exchange clears, settles and guarantees matched transactions in contracts occurring through the facilities of the exchange. In addition, the clearing house establishes and monitors financial requirements for clearing members and conveys certain clearing privileges in conjunction with the relevant exchange markets.

The clearing house establishes clearing level performance bonds (margins) for all products of the exchange and establishes minimum performance bond requirements for customers of such products. A performance bond, also referred to as a margin requirement, corresponds with the funds that must be deposited by a customer with his or her broker, by a broker with a clearing member or by a clearing member with the clearing house, for the purpose of insuring the broker or clearing house against loss on open futures or options contracts. This is not a part payment on a purchase. The performance bond helps to ensure the financial integrity of brokers, clearing members and the exchange as a whole. The performance bond refers to the minimum dollar deposit required by the clearing house from clearing members in accordance with their positions. Maintenance, or maintenance margin, refers to a sum, usually smaller than the initial performance bond, which must remain on deposit in the customer's account for any position at all times. The initial margin is the total amount of margin per contract required by the broker when a futures position is opened. A drop in funds below this level requires a deposit back to the initial margin levels, i.e., a performance bond call. If a customer's equity in any futures position drops to or under the maintenance level because of adverse price action, the broker must issue a performance bond/margin call to restore the customer's equity. A performance bond call, also referred to as a margin call, is a demand for additional funds to bring the customer's account back up to the initial performance bond level whenever adverse price movements cause the account to go below the maintenance.

The exchange derives its financial stability in large part by removing debt obligations among market participants as they occur. This is accomplished by determining a settlement price at the close of the market each day for each contract and marking all open positions to that price, referred to as "mark to market." Every contract is debited or credited based on that trading session's gains or losses. As prices move for or against a position, funds flow into and out of the trading account. In the case of the CME, each business day by 6:40 a.m. Chicago time, based on the mark-to-the-market of all open positions to the previous trading day's settlement price, the clearing house pays to or collects cash from each clearing member. This cash flow, known as settlement variation, is performed by CME's settlement banks based on instructions issued by the clearing house. All payments to and collections from clearing members are made in "same-day" funds. In addition to the 6:40 a.m. settlement, a daily intra-day mark-to-the market of all open positions, including trades executed during the overnight GLOBEX®, the CME's electronic trading systems, trading session and the current day's trades matched before 11:15 a.m., is performed using current prices. The resulting cash payments are made intra-day for same day value. In times of extreme price volatility, the clearing house has the authority to perform additional intra-day mark-to-the-market calculations on open positions and to call for immediate payment of settlement variation. CME's mark-to-the-market settlement system differs from the settlement systems implemented by many other financial markets, including the interbank, Treasury securities, over-the-counter foreign exchange and debt, options, and equities markets, where participants regularly assume credit exposure to each other. In those markets, the failure of one participant can have a ripple effect on the solvency of the other participants. Conversely, CME's mark-to-the-market system does not allow losses to accumulate over time or allow a market participant the opportunity to defer losses associated with market positions.

While the disclosed embodiments may be described in reference to the CME, it should be appreciated that these embodiments are applicable to any exchange. Such other exchanges may include a clearing house that, like the CME clearing house, clears, settles, and guarantees all matched transactions in contracts of the exchange occurring through its facilities. In addition, such clearing houses establish and monitor financial requirements for clearing members and convey certain clearing privileges in conjunction with the relevant exchange markets.

The disclosed embodiments are also not limited to uses by a clearing house or exchange for purposes of enforcing a performance bond or margin requirement. For example, a market participant may use the disclosed embodiments in a simulation or other analysis of a portfolio. In such cases, the settlement price may be useful as an indication of a value at risk and/or cash flow obligation rather than a performance bond. The disclosed embodiments may also be used by market participants or other entities to forecast or predict the effects of a prospective position on the margin requirement of the market participant.

The embodiments may be described in terms of a distributed computing system. The particular examples identify a specific set of components useful in a futures and options exchange. However, many of the components and inventive features are readily adapted to other electronic trading environments. The specific examples described herein may teach specific protocols and/or interfaces, although it should be understood that the principles involved may be extended to, or applied in, other protocols and interfaces.

It should be appreciated that the plurality of entities utilizing or involved with the disclosed embodiments, e.g., the market participants, may be referred to by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another market participant and/or the exchange.

An exemplary trading network environment for implementing trading systems and methods is shown in FIG. 1. An exchange computer system 100 receives messages that include orders and transmits market data related to orders and trades to users, such as via wide area network 126 and/or local area network 124 and computer devices 114, 116, 118, 120 and 122, as described herein, coupled with the exchange computer system 100.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

Figure 2:
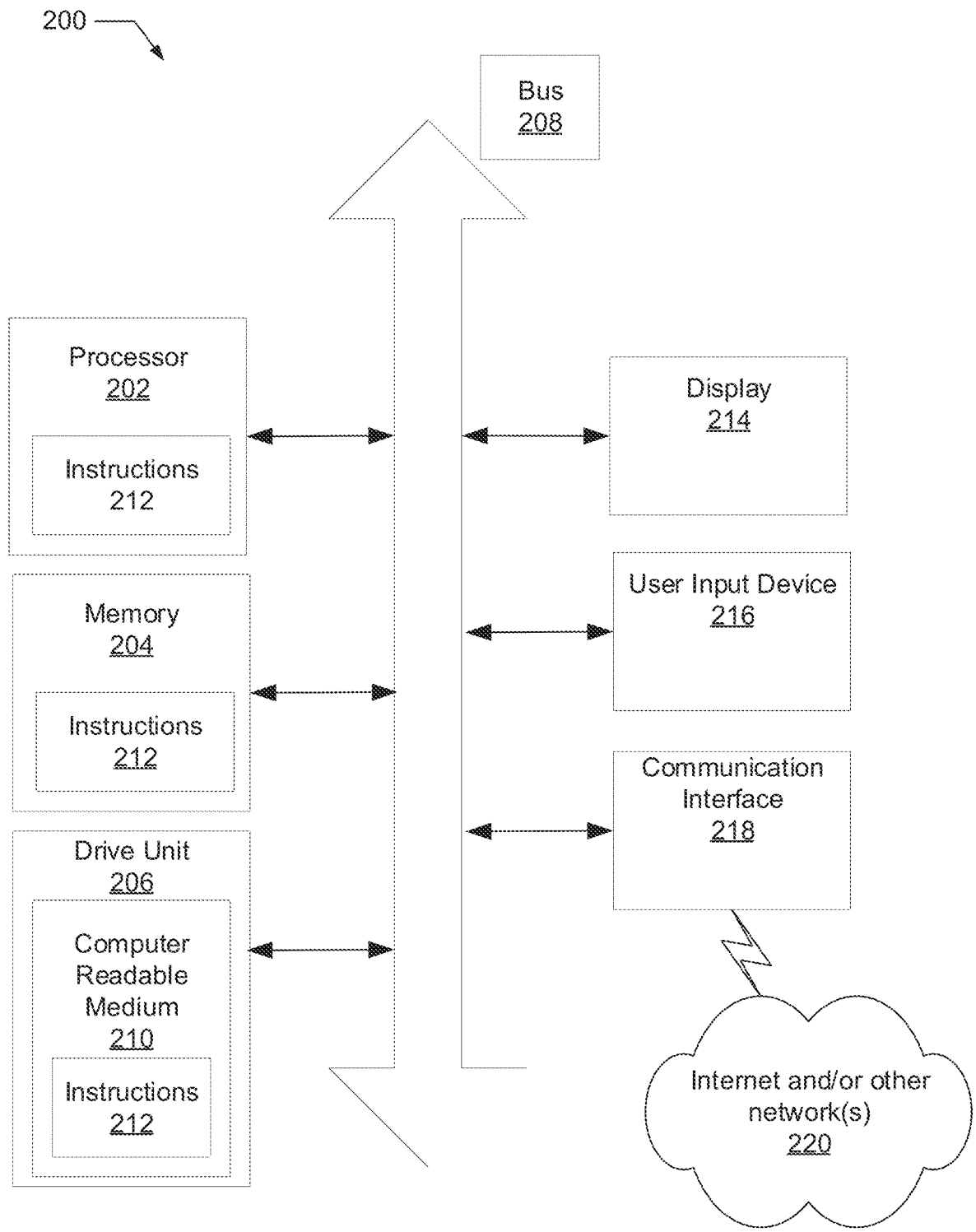
FIG. 2 depicts an illustrative embodiment of a general computer system for use with the disclosed embodiments.

The exchange computer system 100 may be implemented with one or more mainframe, desktop, or other computers, such as the example computer 200 described herein with respect to FIG. 2. A user database 102 may be provided which includes information identifying traders and other users of exchange computer system 100, such as account numbers or identifiers, usernames and passwords. An account data module 104 may be provided which may process account information that may be used during trades. A match engine module 106 may be included to match bid and offer prices and may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices, e.g., in a continuous auction market, or also operate as an order accumulation buffer for a batch auction market.

A market data module 112 may be included to collect market data and prepare the data for transmission to users.

A risk management module 134 may be included to compute and determine a user's risk utilization in relation to the user's defined risk thresholds. The risk management module 134 may also be configured to determine risk assessments or exposure levels in connection with positions held by a market participant.

The risk management module 134 may be configured to administer, manage, or maintain one or more margining mechanisms implemented by the exchange computer system 100. Such administration, management or maintenance may include managing a number of database records reflective of margin accounts of the market participants. In some embodiments, the risk management module 134 implements one or more aspects of the disclosed embodiments, including, for instance, principal component analysis (PCA) based margining, in connection with interest rate swap (IRS) portfolios, as described herein.

An order processing module 136 may be included to decompose delta-based, spread instrument, bulk, and other types of composite orders for processing by the order book module 110 and/or the match engine module 106. The order processing module 136 may also be used to implement one or more procedures related to clearing an order.

A message management module 140 may be included to, among other things, receive, and extract orders from, electronic messages as is indicated with one or more aspects of the disclosed embodiments.

A settlement module 142 (or settlement processor or other payment processor) may be included to provide one or more functions related to settling or otherwise administering transactions cleared by the exchange. Settlement module 142 of the exchange computer system 100 may implement one or more settlement price determination techniques. Settlement-related functions need not be limited to actions or events occurring at the end of a contract term. For instance, in some embodiments, settlement-related functions may include or involve daily or other mark to market settlements for margining purposes. In some cases, the settlement module 142 may be configured to communicate with the trade database 108 (or the memory(ies) on which the trade database 108 is stored) and/or to determine a payment amount based on a spot price, the price of the futures contract or other financial instrument, or other price data, at various times. The determination may be made at one or more points in time during the term of the financial instrument in connection with a margining mechanism. For example, the settlement module 142 may be used to determine a mark to market amount on a daily basis during the term of the financial instrument. Such determinations may also be made on a settlement date for the financial instrument for the purposes of final settlement.

In some embodiments, the settlement module 142 may be integrated to any desired extent with one or more of the other modules or processors of the exchange computer system 100. For example, the settlement module 142 and the risk management module 134 may be integrated to any desired extent. In some cases, one or more margining procedures or other aspects of the margining mechanism(s) may be implemented by the settlement module 142.

It should be appreciated that concurrent processing limits may be defined by or imposed separately or in combination on one or more of the trading system components, including the user database 102, the account data module 104, the match engine module 106, the trade database 108, the order book module 110, the market data module 112, the risk management module 134, the order processing module 136, the message management module 140, the settlement module 142, or other component of the exchange computer system 100.

In an embodiment, the message management module 140, as coupled with the order book module 110, may be configured for receiving a plurality of electronic messages, each of the plurality of messages having an associated action to be executed within a designated period of time having a beginning time and an ending time, wherein at least one electronic message of the plurality of electronic messages comprises data representative of a particular time between the beginning and end of the period of time at which the action associated with the at least one electronic message is to be executed. The exchange computer system 100 may then be further configured to execute the action associated with the at least one temporally specific message at the particular time.

Figure 3:
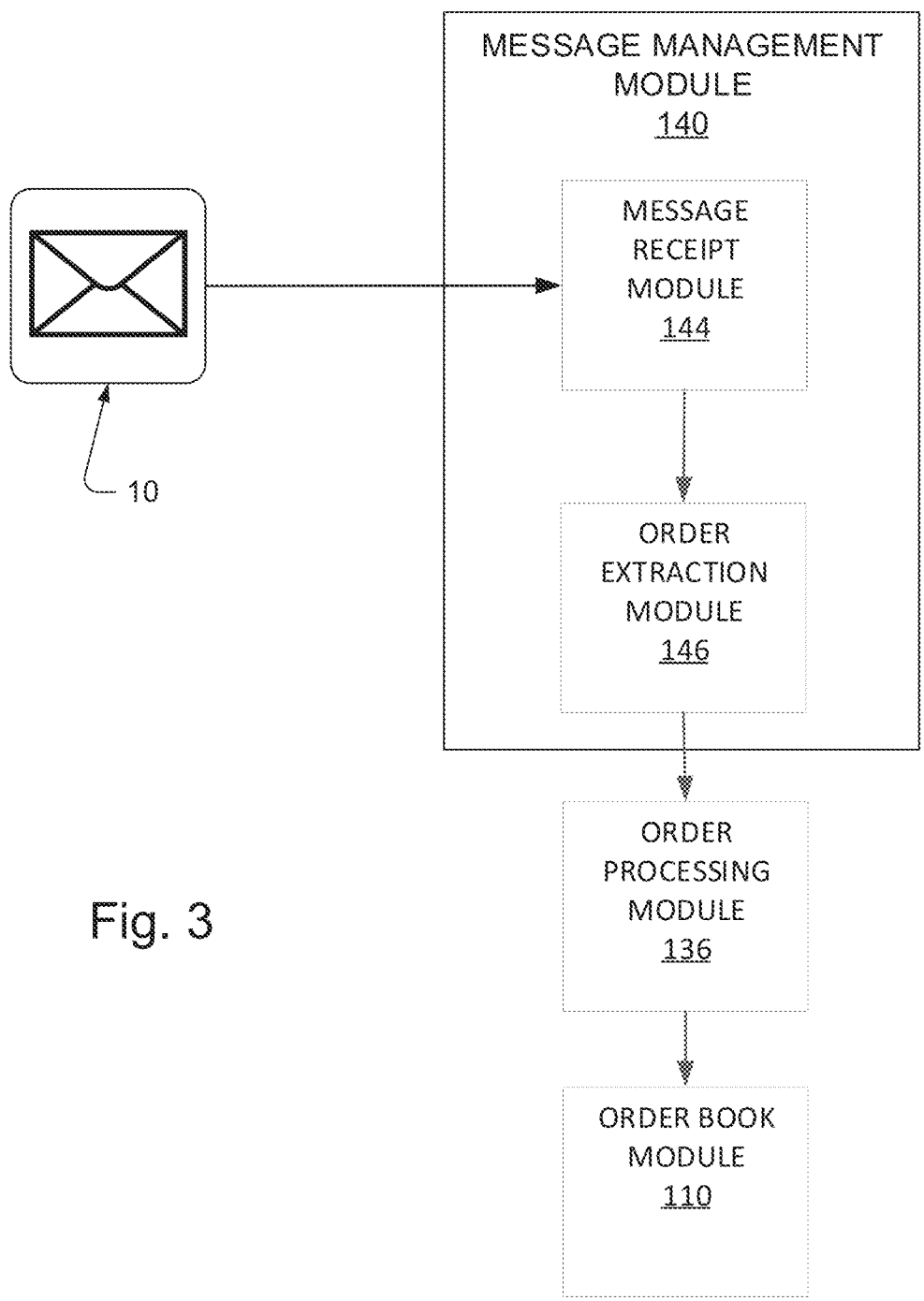
FIG. 3 depicts an example market order message management system for implementing the disclosed embodiments.

The message management module 140 may define a point of ingress into the exchange computer system 100 where messages are ordered and considered to be received by the system. This may be considered a point of determinism in the exchange computer system 100 that defines the earliest point where the system can ascribe an order of receipt to arriving messages. The point of determinism may or may not be at or near the demarcation point between the exchange computer system 100 and a public/internet network infrastructure. FIG. 3 provides additional details for the message management module 140.

The disclosed mechanisms may be implemented at any logical and/or physical point(s), or combinations thereof, at which the relevant information/data may be monitored or is otherwise accessible or measurable, including one or more gateway devices, modems, the computers or terminals of one or more market participants, etc.

One skilled in the art will appreciate that one or more modules described herein may be implemented using, among other things, a tangible computer-readable medium comprising computer-executable instructions (e.g., executable software code). Alternatively, modules may be implemented as software code, firmware code, specifically configured hardware, or processors, and/or a combination of the aforementioned. For example, the modules may be embodied as part of an exchange 100 for financial instruments. It should be appreciated that the disclosed embodiments may be implemented as a different or separate module of the exchange computer system 100, or a separate computer system coupled with the exchange computer system 100 so as to have access to margin account record, pricing, and/or other data. As described herein, the disclosed embodiments may be implemented as a centrally accessible system or as a distributed system, e.g., where some of the disclosed functions are performed by the computer systems of the market participants.

As shown in FIG. 1, the exchange computer system 100 further includes a message management module 140 which may implement, in conjunction with the market data module 112, the disclosed mechanisms for managing electronic messages containing financial data sent between an exchange and a plurality of market participants, or vice versa. However, as was discussed above, the disclosed mechanisms may be implemented at any logical and/or physical point(s) through which the relevant message traffic, and responses thereto, flows or is otherwise accessible, including one or more gateway devices, modems, the computers or terminals of one or more traders, etc.

FIG. 3 illustrates an embodiment of market order message management as implemented using the message management module 140 and order book module 110 of the exchange computer system 100. As such, a message 10 may be received from a market participant at the exchange computer system 100 by a message receipt module 144 of the message management module 140. The message receipt module 144 processes the message 10 by interpreting the content of the message based on the message transmit protocol, such as the transmission control protocol ("TCP"), to provide the content of the message 10 for further processing by the exchange computer system.

For example, the message management module 140 may determine the transaction type of the transaction requested in a given message. A message may include an instruction to perform a type of transaction. The transaction type may be, in one embodiment, a request/offer/order to either buy or sell a specified quantity or units of a financial instrument at a specified price or value.

Further processing may be performed by the order extraction module 146. The order extraction module 146 may be configured to detect, from the content of the message 10 provided by the message receipt module 144, characteristics of an order for a transaction to be undertaken in an electronic marketplace. For example, the order extraction module 146 may identify and extract order content such as a price, product, volume, and associated market participant for an order. The order extraction module 146 may also identify and extract data indicating an action to be executed by the exchange computer system 100 with respect to the extracted order. The order extraction module may also identify and extract other order information and other actions associated with the extracted order. All extracted order characteristics, other information, and associated actions extracted from a message for an order may be collectively considered an order as described and referenced herein.

Order or message characteristics may include, for example, the state of the system after a message is received, arrival time (e.g., the time a message arrives at the MSG or Market Segment Gateway), message type (e.g., new, modify, cancel), and the number of matches generated by a message. Order or message characteristics may also include market participant side (e.g., buy or sell) or time in force (e.g., a good until end of day order that is good for the full trading day, a good until canceled ordered that rests on the order book until matched, or a fill or kill order that is canceled if not filled immediately).

The order may be communicated from the order extraction module 146 to an order processing module 136. The order processing module 136 may be configured to interpret the communicated order, and manage the order characteristics, other information, and associated actions as they are processed through an order book module 110 and eventually transacted on an electronic market. For example, the order processing module 136 may store the order characteristics and other content and execute the associated actions. In an embodiment, the order processing module may execute an associated action of placing the order into an order book for an electronic trading system managed by the order book module 110. In an embodiment, placing an order into an order book and/or into an electronic trading system may be considered a primary action for an order. The order processing module 136 may be configured in various arrangements and may be configured as part of the order book module 110, part of the message management module 140, or as an independent functioning module.

The embodiments described herein utilize trade related electronic messages such as mass quote messages, individual order messages, modification messages, cancelation messages, etc., so as to enact trading activity in an electronic market. The trading entity and/or market participant may have one or multiple trading terminals associated with the session. Furthermore, the financial instruments may be financial derivative products. Derivative products may include futures contracts, options on futures contracts, futures contracts that are functions of or related to other futures contracts, swaps, swaptions, or other financial instruments that have their price related to or derived from an underlying product, security, commodity, equity, index, or interest rate product. In one embodiment, the orders are for options contracts that belong to a common option class. Orders may also be for baskets, quadrants, other combinations of financial instruments, etc. The option contracts may have a plurality of strike prices and/or comprise put and call contracts. A mass quote message may be received at an exchange. As used herein, an exchange computing system 100 includes a place or system that receives and/or executes orders.

In an embodiment, a plurality of electronic messages is received from the network. The plurality of electronic messages may be received at a network interface for the electronic trading system. The plurality of electronic messages may be sent from market participants. The plurality of messages may include order characteristics and be associated with actions to be executed with respect to an order that may be extracted from the order characteristics. The action may involve any action as associated with transacting the order in an electronic trading system. The actions may involve placing the orders within a particular market and/or order book of a market in the electronic trading system.

In an embodiment, the market may operate using characteristics that involve collecting orders over a period of time, such as a batch auction market. In such an embodiment, the period of time may be considered an order accumulation period. The period of time may involve a beginning time and an ending time, with orders placed in the market after the beginning time, and the placed order matched at or after the ending time. As such, the action associated with an order extracted from a message may involve placing the order in the market within the period of time. Also, electronic messages may be received prior to or after the beginning time of the period of time.

The electronic messages may also include other data relating to the order. In an embodiment, the other data may be data indicating a particular time in which the action is to be executed. As such, the order may be considered a temporally specific order. The particular time in which an action is undertaken may be established with respect to any measure of absolute or relative time. In an embodiment, the time in which an action is undertaken may be established with reference to the beginning time of the time period or ending time of the time period in a batch auction embodiment. For example, the particular time may be a specific amount of time, such as 10 milliseconds, prior to the ending time of an order accumulation period in the batch auction. Further, the order accumulation period may involve dissecting the accumulation period into multiple consecutive, overlapping, or otherwise divided, sub-periods of time. For example, the sub-periods may involve distinct temporal windows within the order accumulation period. As such, the particular time may be an indicator of a particular temporal window during the accumulation period. For example, the particular time may be specified as the last temporal window prior to the ending time of the accumulation period.

In an embodiment, the electronic message may also include other actions to be taken with respect to the order. These other actions may be actions to be executed after the initial or primary action associated with the order. For example, the actions may involve modifying or canceling an already placed order. Further, in an embodiment, the other data may indicate order modification characteristics. For example, the other data may include a price or volume change in an order. The other actions may involve modifying the already placed order to align with the order modification characteristics, such as changing the price or volume of the already placed order.

In an embodiment, other actions may be dependent actions. For example, the execution of the actions may involve a detection of an occurrence of an event. Such triggering events may be described as other data in the electronic message. For example, the triggering event may be a release of an economic statistic from an organization relating to a product being bought or sold in the electronic market, a receipt of pricing information from a correlated electronic market, a detection of a change in market sentiment derived from identification of keywords in social media or public statements of officials related to a product being bought or sold in the electronic market, and/or any other event or combination of events which may be detected by an electronic trading system.

In an embodiment, the action, or a primary action, associated with an order may be executed. For example, an order extracted from electronic message order characteristics may be placed into a market, or an electronic order book for a market, such that the order may be matched with other orders counter thereto.

In an embodiment involving a market operating using batch auction principles, the action, such as placing the order, may be executed subsequent to the beginning time of the order accumulation period, but prior to the ending time of the order accumulation period. Further, as indicated above, a message may also include other information for the order, such as a particular time the action is to be executed. In such an embodiment, the action may be executed at the particular time. For example, in an embodiment involving a batch auction process having sub-periods during an order accumulation period, an order may be placed during a specified sub-period of the order accumulation period. The disclosed embodiments may be applicable to batch auction processing, as well as continuous processing.

Also, it may be noted that messages may be received prior or subsequent to the beginning time of an order accumulation period. Orders extracted from messages received prior to the beginning time may have the associated actions, or primary actions such as placing the order, executed at any time subsequent to the beginning time, but prior to the ending time, of the order accumulation period when no particular time for the execution is indicated in the electronic message. In an embodiment, messages received prior to the beginning time but not having a particular time specified will have the associated action executed as soon as possible after the beginning time. Because of this, specifying a time for order action execution may allow a distribution and more definite relative time of order placement so as to allow resources of the electronic trading system to operate more efficiently.

In an embodiment, the execution of temporally specific messages may be controlled by the electronic trading system such that a limited or maximum number may be executed in any particular accumulation period, or sub-period. In an embodiment, the order accumulation time period involves a plurality of sub-periods involving distinct temporal windows, a particular time indicated by a message may be indicative of a particular temporal window of the plurality of temporal windows, and the execution of the at least one temporally specific message is limited to the execution of a specified sub-period maximum number of temporally specific messages during a particular sub-period. The electronic trading system may distribute the ability to submit temporally specific message to selected market participants. For example, only five temporally specific messages may be allowed in any one particular period or sub-period. Further, the ability to submit temporally specific messages within particular periods or sub-periods may be distributed based on any technique. For example, the temporally specific messages for a particular sub-period may be auctioned off or otherwise sold by the electronic trading system to market participants. Also, the electronic trading system may distribute the temporally specific messages to preferred market participants, or as an incentive to participate in a particular market.

In an embodiment, an event occurrence may be detected. The event occurrence may be the occurrence of an event that was specified as other information relating to an order extracted from an electronic message. The event may be a triggering event for a modification or cancelation action associated with an order. The event may be detected subsequent to the execution of the first action when an electronic message further comprises the data representative of the event and a secondary action associated with the order. In an embodiment involving a market operating on batch auction principles, the event may be detected subsequent to the execution of a first action, placing an order, but prior to the ending time of an order accumulation period in which the action was executed.

In an embodiment, other actions associated with an order may be executed. The other actions may be any action associated with an order. For example, the action may be a conditional action that is executed in response to a detection of an occurrence of an event. Further, in a market operating using batch auction principles, the conditional action may be executed after the placement of an order during an order accumulation period, but in response to a detection of an occurrence of an event prior to an ending time of the order accumulation period. In such an embodiment, the conditional action may be executed prior to the ending time of the order accumulation period. For example, the placed order may be canceled, or modified using other provided order characteristics in the message, in response to the detection of the occurrence of the event.

An event may be a release of an economic statistic or a fluctuation of prices in a correlated market. An event may also be a perceptible change in market sentiment of a correlated market. A change may be perceptible based on a monitoring of orders or social media for keywords in reference to the market in question. For example, electronic trading systems may be configured to be triggered for action by a use of keywords during a course of ongoing public statements of officials who may be in a position to impact markets, such as Congressional testimony of the Chairperson of the Federal Reserve System.

The other, secondary, or supplemental action may also be considered a modification of a first action executed with respect to an order. For example, a cancelation may be considered a cancelation of the placement of the order. Further, a secondary action may have other data in the message which indicates a specific time in which the secondary action may be executed. The specific time may be a time relative to a first action, or placement of the order, or relative to an accumulation period in a batch auction market. For example, the specific time for execution of the secondary action may be at a time specified relative and prior to the ending period of the order accumulation period. Further, multiple secondary actions may be provided for a single order. Also, with each secondary action a different triggering event may be provided.

In an embodiment, an incoming transaction may be received. The incoming transaction may be from, and therefore associated with, a market participant of an electronic market managed by an electronic trading system. The transaction may involve an order as extracted from a received message and may have an associated action. The actions may involve placing an order to buy or sell a financial product in the electronic market or modifying or deleting such an order. In an embodiment, the financial product may be based on an associated financial instrument which the electronic market is established to trade.

In an embodiment, the action associated with the transaction is determined. For example, it may be determined whether the incoming transaction comprises an order to buy or sell a quantity of the associated financial instrument or an order to modify or cancel an existing order in the electronic market. Orders to buy or sell and orders to modify or cancel may be acted upon differently by the electronic market. For example, data indicative of different characteristics of the types of orders may be stored.

In an embodiment, data relating to the received transaction is stored. The data may be stored in any device, or using any technique, operable to store and provide recovery of data. For example, a memory 204 or computer readable medium 210, may be used to store data, as is described with respect to FIG. 2 in further detail herein. Data may be stored relating received transactions for a period of time, indefinitely, or for a rolling most recent time period such that the stored data is indicative of the market participant's recent activity in the electronic market.

If and/or when a transaction is determined to be an order to modify or cancel a previously placed, or existing, order, data indicative of these actions may be stored. For example, data indicative of a running count of a number or frequency of the receipt of modify or cancel orders from the market participant may be stored. A number may be a total number of modify or cancel orders received from the market participant, or a number of modify or cancel orders received from the market participant over a specified time. A frequency may be a time based frequency, as in a number of cancel or modify orders per unit of time, or a number of cancel or modify orders received from the market participant as a percentage of total transactions received from the participant, which may or may not be limited by a specified length of time.

If and/or when a transaction is determined to be an order to buy or sell a financial product, or financial instrument, other indicative data may be stored. For example, data indicative of quantity and associated price of the order to buy or sell may be stored.

Data indicative of attempts to match incoming orders may also be stored. The data may be stored in any device, or using any technique, operable to store and provide recovery of data. For example, a memory 204 or computer readable medium 210, may be used to store data, as is described with respect to FIG. 2. The acts of the process as described herein may also be repeated. As such, data for multiple received transactions for multiple market participants may be stored and used as describe herein.

The order processing module 136 may also store data indicative of characteristics of the extracted orders. For example, the order processing module may store data indicative of orders having an associated modify or cancel action, such as by recording a count of the number of such orders associated with particular market participants. The order processing module may also store data indicative of quantities and associated prices of orders to buy or sell a product placed in the market order book 110, as associated with particular market participants.

Also, the order processing module 136 may be configured to calculate and associate with particular orders a value indicative of an associated market participant's market activity quality, which is a value indicative of whether the market participant's market activity increases or tends to increase liquidity of a market. This value may be determined based on the price of the particular order, previously stored quantities of orders from the associated market participant, the previously stored data indicative of previously received orders to modify or cancel as associated with the market participant, and previously stored data indicative of a result of the attempt to match previously received orders stored in association with the market participant. The order processing module 136 may determine or otherwise calculate scores indicative of the quality value based on these stored extracted order characteristics, such as an MQI as described herein.

Further, electronic trading systems may perform actions on orders placed from received messages based on various characteristics of the messages and/or market participants associated with the messages. These actions may include matching the orders either during a continuous auction process, or at the conclusion of a collection period during a batch auction process. The matching of orders may be by any technique.

The matching of orders may occur based on a priority indicated by the characteristics of orders and market participants associated with the orders. Orders having a higher priority may be matched before orders of a lower priority. This priority may be determined using various techniques. For example, orders that were indicated by messages received earlier may receive a higher priority to match than orders that were indicated by messages received later. Also, scoring or grading of the characteristics may provide for priority determination. Data indicative of order matches may be stored by a match engine and/or an order processing module 136 and used for determining MQI scores of market participants.

Generally, a market may involve market makers, such as market participants who consistently provide bids and/or offers at specific prices in a manner typically conducive to balancing risk, and market takers who may be willing to execute transactions at prevailing bids or offers may be characterized by more aggressive actions so as to maintain risk and/or exposure as a speculative investment strategy. From an alternate perspective, a market maker may be considered a market participant who places an order to sell at a price at which there is no previously or concurrently provided counter order. Similarly, a market taker may be considered a market participant who places an order to buy at a price at which there is a previously or concurrently provided counter order. A balanced and efficient market may involve both market makers and market takers, coexisting in a mutually beneficial basis. The mutual existence, when functioning properly, may facilitate liquidity in the market such that a market may exist with "tight" bid-ask spreads (e.g., small difference between bid and ask prices) and a "deep" volume from many currently provided orders such that large quantity orders may be executed without driving prices significantly higher or lower.

As such, both market participant types are useful in generating liquidity in a market, but specific characteristics of market activity taken by market participants may provide an indication of a particular market participant's effect on market liquidity. For example, a Market Quality Index ("MQI") of an order may be determined using the characteristics. An MQI may be considered a value indicating a likelihood that a particular order will improve or facilitate liquidity in a market. That is, the value may indicate a likelihood that the order will increase a probability that subsequent requests and transaction from other market participants will be satisfied. As such, an MQI may be determined based on a proximity of the entered price of an order to a midpoint of a current bid-ask price spread, a size of the entered order, a volume or quantity of previously filled orders of the market participant associated with the order, and/or a frequency of modifications to previous orders of the market participant associated with the order. In this way, an electronic trading system may function to assess and/or assign an MQI to received electronic messages to establish messages that have a higher value to the system, and thus the system may use computing resources more efficiently by expending resources to match orders of the higher value messages prior to expending resources of lower value messages.

While an MQI may be applied to any or all market participants, such an index may also be applied only to a subset thereof, such as large market participants, or market participants whose market activity as measured in terms of average daily message traffic over a limited historical time period exceeds a specified number. For example, a market participant generating more than 500, 1,000, or even 10,000 market messages per day may be considered a large market participant.

An exchange provides one or more markets for the purchase and sale of various types of products including financial instruments such as stocks, bonds, futures contracts, options, currency, cash, and other similar instruments. Agricultural products and commodities are also examples of products traded on such exchanges. A futures contract is a product that is a contract for the future delivery of another financial instrument such as a quantity of grains, metals, oils, bonds, currency, or cash. Generally, each exchange establishes a specification for each market provided thereby that defines at least the product traded in the market, minimum quantities that must be traded, and minimum changes in price (e.g., tick size). For some types of products (e.g., futures or options), the specification further defines a quantity of the underlying product represented by one unit (or lot) of the product, and delivery and expiration dates. As will be described, the exchange may further define the matching algorithm, or rules, by which incoming orders will be matched/allocated to resting orders.

Market participants, e.g., traders, use software to send orders or messages to the trading platform. The order identifies the product, the quantity of the product the trader wishes to trade, a price at which the trader wishes to trade the product, and a direction of the order (i.e., whether the order is a bid, i.e., an offer to buy, or an ask, i.e., an offer to sell). It will be appreciated that there may be other order types or messages that traders can send including requests to modify or cancel a previously submitted order.

The exchange computer system monitors incoming orders received thereby and attempts to identify, i.e., match or allocate, as described herein, one or more previously received, but not yet matched, orders, i.e., limit orders to buy or sell a given quantity at a given price, referred to as "resting" orders, stored in an order book database, wherein each identified order is contra to the incoming order and has a favorable price relative to the incoming order. An incoming order may be an "aggressor" order, i.e., a market order to sell a given quantity at whatever may be the current resting bid order price(s) or a market order to buy a given quantity at whatever may be the current resting ask order price(s). An incoming order may be a "market making" order, i.e., a market order to buy or sell at a price for which there are currently no resting orders. In particular, if the incoming order is a bid, i.e., an offer to buy, then the identified order(s) will be an ask, i.e., an offer to sell, at a price that is identical to or higher than the bid price. Similarly, if the incoming order is an ask, i.e., an offer to sell, the identified order(s) will be a bid, i.e., an offer to buy, at a price that is identical to or lower than the offer price.

An exchange computing system may receive conditional orders or messages for a data object, where the order may include two prices or values: a reference value and a stop value. A conditional order may be configured so that when a product represented by the data object trades at the reference price, the stop order is activated at the stop value. For example, if the exchange computing system's order management module includes a stop order with a stop price of 5 and a limit price of 1 for a product, and a trade at 5 (i.e., the stop price of the stop order) occurs, then the exchange computing system attempts to trade at 1 (i.e., the limit price of the stop order). In other words, a stop order is a conditional order to trade (or execute) at the limit price that is triggered (or elected) when a trade at the stop price occurs.

Stop orders also rest on, or are maintained in, an order book to monitor for a trade at the stop price, which triggers an attempted trade at the limit price. In some embodiments, a triggered limit price for a stop order may be treated as an incoming order.

Upon identification (matching) of a contra order(s), a minimum of the quantities associated with the identified order and the incoming order is matched and that quantity of each of the identified and incoming orders become two halves of a matched trade that is sent to a clearing house. The exchange computer system considers each identified order in this manner until either all of the identified orders have been considered or all of the quantity associated with the incoming order has been matched, i.e., the order has been filled. If any quantity of the incoming order remains, an entry may be created in the order book database and information regarding the incoming order is recorded therein, i.e., a resting order is placed on the order book for the remaining quantity to await a subsequent incoming order counter thereto.

It should be appreciated that in electronic trading systems implemented via an exchange computing system, a trade price (or match value) may differ from (i.e., be better for the submitter, e.g., lower than a submitted buy price or higher than a submitted sell price) the limit price that is submitted, e.g., a price included in an incoming message, or a triggered limit price from a stop order.

As used herein, "better" than a reference value means lower than the reference value if the transaction is a purchase transaction, and higher than the reference value if the transaction is a sell transaction. Said another way, for purchase transactions, lower values are better, and for relinquish or sell transactions, higher values are better.

Traders access the markets on a trading platform using trading software that receives and displays at least a portion of the order book for a market, i.e., at least a portion of the currently resting orders, enables a trader to provide parameters for an order for the product traded in the market, and transmits the order to the exchange computer system. The trading software typically includes a graphical user interface to display at least a price and quantity of some of the entries in the order book associated with the market. The number of entries of the order book displayed is generally preconfigured by the trading software, limited by the exchange computer system, or customized by the user. Some graphical user interfaces display order books of multiple markets of one or more trading platforms. The trader may be an individual who trades on his/her behalf, a broker trading on behalf of another person or entity, a group, or an entity. Furthermore, the trader may be a system that automatically generates and submits orders.

If the exchange computer system identifies that an incoming market order may be filled by a combination of multiple resting orders, e.g., the resting order at the best price only partially fills the incoming order, the exchange computer system may allocate the remaining quantity of the incoming, i.e., that which was not filled by the resting order at the best price, among such identified orders in accordance with prioritization and allocation rules/algorithms, referred to as "allocation algorithms" or "matching algorithms," as, for example, may be defined in the specification of the particular financial product or defined by the exchange for multiple financial products. Similarly, if the exchange computer system identifies multiple orders contra to the incoming limit order and that have an identical price which is favorable to the price of the incoming order, i.e., the price is equal to or better, e.g., lower if the incoming order is a buy (or instruction to purchase) or higher if the incoming order is a sell (or instruction to relinquish), than the price of the incoming order, the exchange computer system may allocate the quantity of the incoming order among such identified orders in accordance with the matching algorithms as, for example, may be defined in the specification of the particular financial product or defined by the exchange for multiple financial products.

An exchange responds to inputs, such as trader orders, cancelation, etc., in a manner as expected by the market participants, such as based on market data, e.g., prices, available counter-orders, etc., to provide an expected level of certainty that transactions will occur in a consistent and predictable manner and without unknown or unascertainable risks. Accordingly, the method by which incoming orders are matched with resting orders must be defined so that market participants have an expectation of what the result will be when they place an order or have resting orders and an incoming order is received, even if the expected result is, in fact, at least partially unpredictable due to some component of the process being random or arbitrary or due to market participants having imperfect or less than all information, e.g., unknown position of an order in an order book. Typically, the exchange defines the matching/allocation algorithm that will be used for a particular financial product, with or without input from the market participants. Once defined for a particular product, the matching/allocation algorithm is typically not altered, except in limited circumstance, such as to correct errors or improve operation, so as not to disrupt trader expectations. It will be appreciated that different products offered by a particular exchange may use different matching algorithms.

For example, a first-in/first-out (FIFO) matching algorithm, also referred to as a "Price Time" algorithm, considers each identified order sequentially in accordance with when the identified order was received. The quantity of the incoming order is matched to the quantity of the identified order at the best price received earliest, then quantities of the next earliest best price orders, and so on until the quantity of the incoming order is exhausted. Some product specifications define the use of a pro-rata matching algorithm, wherein a quantity of an incoming order is allocated to each of plurality of identified orders proportionally. Some exchange computer systems provide a priority to certain standing orders in particular markets. An example of such an order is the first order that improves a price (i.e., improves the market) for the product during a trading session. To be given priority, the trading platform may require that the quantity associated with the order is at least a minimum quantity. Further, some exchange computer systems cap the quantity of an incoming order that is allocated to a standing order on the basis of a priority for certain markets. In addition, some exchange computer systems may give a preference to orders submitted by a trader who is designated as a market maker for the product. Other exchange computer systems may use other criteria to determine whether orders submitted by a particular trader are given a preference. Typically, when the exchange computer system allocates a quantity of an incoming order to a plurality of identified orders at the same price, the trading host allocates a quantity of the incoming order to any orders that have been given priority. The exchange computer system thereafter allocates any remaining quantity of the incoming order to orders submitted by traders designated to have a preference, and then allocates any still remaining quantity of the incoming order using the FIFO or pro-rata algorithms. Pro-rata algorithms used in some markets may require that an allocation provided to a particular order in accordance with the pro-rata algorithm must meet at least a minimum allocation quantity. Any orders that do not meet or exceed the minimum allocation quantity are allocated to on a FIFO basis after the pro-rata allocation (if any quantity of the incoming order remains). More information regarding order allocation may be found in U.S. Pat. No. 7,853,499, the entirety of which is incorporated by reference herein and relied upon.

The disclosed embodiments provide examples of prioritizing messages/orders by the quarantine system based on whether a message's quarantine field indicates that the message should accept a delay. In particular, messages having a quarantine flag are de-prioritized as described herein by. Moreover, the transaction processor, which actually process (e.g., attempts to match) electronic data transaction request messages may also modify the priority according to which a message is processed based on whether that message is a quarantined message, i.e., experienced a delay at the quarantine system. The transaction processor may also modify the trade allocation for a message/order based on whether that message is a quarantined message Other examples of matching algorithms which may be defined for allocation of orders of a particular financial product include:

Price Explicit Time
Order Level Pro Rata
Order Level Priority Pro Rata
Preference Price Explicit Time
Preference Order Level Pro Rata
Preference Order Level Priority Pro Rata
Threshold Pro-Rata
Priority Threshold Pro-Rata
Preference Threshold Pro-Rata
Priority Preference Threshold Pro-Rata
Split Price-Time Pro-Rata For example, the Price Explicit Time trading policy is based on the basic Price Time trading policy with Explicit Orders having priority over Implied Orders at the same price level. The order of traded volume allocation at a single price level may therefore be:

Explicit order with oldest timestamp first, followed by
Any remaining explicit orders in timestamp sequence (First In, First Out—FIFO) next, followed by
Implied order with oldest timestamp next, followed by
Any remaining implied orders in timestamp sequence (FIFO).

In Order Level Pro Rata, also referred to as Price Pro Rata, priority is given to orders at the best price (highest for a bid, lowest for an offer). If there are several orders at this best price, equal priority is given to every order at this price and incoming business is divided among these orders in proportion to their order size. The Pro Rata sequence of events is:

1. Extract all potential matching orders at best price from the order book into a list.
2. Sort the list by order size, largest order size first. If equal order sizes, oldest timestamp first. This is the matching list.
3. Find the 'Matching order size, which is the total size of all the orders in the matching list.
4. Find the 'tradable volume', which is the smallest of the matching volume and the volume left to trade on the incoming order.
5. Allocate volume to each order in the matching list in turn, starting at the beginning of the list. If all the tradable volume gets used up, orders near the end of the list may not get allocation.
6. The amount of volume to allocate to each order is given by the formula:

(Order volume/Matching volume)*Tradable volume

The result is rounded down (for example, 21.99999999 becomes 21) unless the result is less than 1, when it becomes 1.

7. If tradable volume remains when the last order in the list had been allocated to, return to step 3.

Note: The matching list is not re-sorted, even though the volume has changed. The order which originally had the largest volume is still at the beginning of the list.

8. If there is still volume left to trade on the incoming order, repeat the entire algorithm at the next price level.

Order Level Priority Pro Rata, also referred to as Threshold Pro Rata, is similar to the Price (or 'Vanilla') Pro Rata algorithm but has a volume threshold defined. Any pro rata allocation below the threshold will be rounded down to 0. The initial pass of volume allocation is carried out in using pro rata; the second pass of volume allocation is carried out using Price Explicit Time. The Threshold Pro Rata sequence of events is:

1. Extract all potential matching orders at best price from the order book into a list.

2. Sort the list by explicit time priority, oldest timestamp first. This is the matching list.
3. Find the 'Matching volume', which is the total volume of all the orders in the matching list.
4. Find the 'tradable volume', which is the smallest of the matching volume and the volume left to trade on the incoming order.
5. Allocate volume to each order in the matching list in turn, starting at the beginning of the list.
6. The amount of volume to allocate to each order is given by the formula:

(Order volume/Matching volume)*Tradable volume

The result is rounded down to the nearest lot (for example, 21.99999999 becomes 21) unless the result is less than the defined threshold in which case it is rounded down to 0.

7. If tradable volume remains when the last order in the list had been allocated to, the remaining volume is allocated in time priority to the matching list.
8. If there is still volume left to trade on the incoming order, repeat the entire algorithm at the next price level.

In the Split Price Time Pro-Rata algorithms, a Price Time Percentage parameter is defined. This percentage of the matching volume at each price is allocated by the Price Explicit Time algorithm and the remainder is allocated by the Threshold Pro-Rata algorithm. There are four variants of this algorithm, with and without Priority and/or Preference. The Price Time Percentage parameter is an integer between 1 and 99. (A percentage of zero would be equivalent to using the respective existing Threshold Pro-Rata algorithm, and a percentage of 100 would be equivalent to using the respective existing Price Time algorithm). The Price Time Volume will be the residual incoming volume, after any priority and/or Preference allocation has been made, multiplied by the Price Time Percentage. Fractional parts will be rounded up, so the Price Time Volume will always be at least 1 lot and may be the entire incoming volume. The Price Time Volume is allocated to resting orders in strict time priority. Any remaining incoming volume after the Price Time Volume has been allocated will be allocated according to the respective Threshold Pro-Rata algorithm. The sequence of allocation, at each price level, is therefore:

1. Priority order, if applicable
2. Preference allocation, if applicable
3. Price Time allocation of the configured percentage of incoming volume
4. Threshold Pro-Rata allocation of any remaining incoming volume
5. Final allocation of any leftover lots in time sequence.

Any resting order may receive multiple allocations from the various stages of the algorithm.

It will be appreciated that there may be other allocation algorithms, including combinations of algorithms, now available or later developed, which may be utilized with the disclosed embodiments, and all such algorithms are contemplated herein. In one embodiment, the disclosed embodiments may be used in any combination or sequence with the allocation algorithms described herein.

One exemplary system for matching is described in U.S. patent application Ser. No. 13/534,399, filed on Jun. 27, 2012, entitled "Multiple Trade Matching Algorithms," published as U.S. Patent Application Publication No. 2014/0006243 A1, the entirety of which is incorporated by reference herein and relied upon, discloses an adaptive match engine which draws upon different matching algorithms, e.g., the rules which dictate how a given order should be allocated among qualifying resting orders, depending upon market conditions, to improve the operation of the market. For example, for a financial product, such as a futures contract, having a future expiration date, the match engine may match incoming orders according to one algorithm when the remaining time to expiration is above a threshold, recognizing that during this portion of the life of the contract, the market for this product is likely to have high volatility. However, as the remaining time to expiration decreases, volatility may decrease. Accordingly, when the remaining time to expiration falls below the threshold, the match engine switches to a different match algorithm which may be designed to encourage trading relative to the declining trading volatility. Thereby, by conditionally switching among matching algorithms within the same financial product, as will be described, the disclosed match engine may automatically adapt to the changing market conditions of a financial product, e.g., a limited life product, in a non-preferential manner, maintaining fair order allocation while improving market liquidity, e.g., over the life of the product.

In one implementation, the system may evaluate market conditions on a daily basis and, based thereon, change the matching algorithm between daily trading sessions, i.e., when the market is closed, such that when the market reopens, a new trading algorithm is in effect for the particular product. As will be described, the disclosed embodiments may facilitate more frequent changes to the matching algorithms so as to dynamically adapt to changing market conditions, e.g., intra-day changes, and even intra-order matching changes. It will be further appreciated that hybrid matching algorithms, which match part of an order using one algorithm and another part of the order using a different algorithm, may also be used.

With respect to incoming orders, some traders, such as automated and/or algorithmic traders, attempt to respond to market events, such as to capitalize upon a mispriced resting order or other market inefficiency, as quickly as possible. This may result in penalizing the trader who makes an errant trade, or whose underlying trading motivations have changed, and who cannot otherwise modify or cancel their order faster than other traders can submit trades there against. It may considered that an electronic trading system that rewards the trader who submits their order first creates an incentive to either invest substantial capital in faster trading systems, participate in the market substantially to capitalize on opportunities (aggressor side/lower risk trading) as opposed to creating new opportunities (market making/higher risk trading), modify existing systems to streamline business logic at the cost of trade quality, or reduce one's activities and exposure in the market. The result may be a lesser quality market and/or reduced transaction volume, and corresponding thereto, reduced fees to the exchange.

With respect to resting orders, allocation/matching suitable resting orders to match against an incoming order can be performed, as described herein, in many different ways. Generally, it will be appreciated that allocation/matching algorithms are only needed when the incoming order quantity is less than the total quantity of the suitable resting orders as, only in this situation, is it necessary to decide which resting order(s) will not be fully satisfied, which trader(s) will not get their orders filled. It can be seen from the above descriptions of the matching/allocation algorithms, that they fall generally into three categories: time priority/first-in-first-out ("FIFO"), pro rata, or a hybrid of FIFO and pro rata.

As described above, matching systems apply a single algorithm, or combined algorithm, to all of the orders received for a particular financial product to dictate how the entire quantity of the incoming order is to be matched/allocated. In contrast, the disclosed embodiments may apply different matching algorithms, singular or combined, to different orders, as will be described, recognizing that the allocation algorithms used by the trading host for a particular market may, for example, affect the liquidity of the market. Specifically, some allocation algorithms may encourage traders to submit more orders, where each order is relatively small, while other allocation algorithms encourage traders to submit larger orders. Other allocation algorithms may encourage a trader to use an electronic trading system that can monitor market activity and submit orders on behalf of the trader very quickly and without intervention. As markets and technologies available to traders evolve, the allocation algorithms used by trading hosts must also evolve accordingly to enhance liquidity and price discovery in markets, while maintaining a fair and equitable market.

FIFO generally rewards the first trader to place an order at a particular price and maintains this reward indefinitely. So, if a trader is the first to place an order at price X, no matter how long that order rests and no matter how many orders may follow at the same price, as soon as a suitable incoming order is received, that first trader will be matched first. This "first mover" system may commit other traders to positions in the queue after the first move traders. Furthermore, while it may be beneficial to give priority to a trader who is first to place an order at a given price because that trader is, in effect, taking a risk, the longer that the trader's order rests, the less beneficial it may be. For instance, it could deter other traders from adding liquidity to the marketplace at that price because they know the first mover (and potentially others) already occupies the front of the queue.

With a pro rata allocation, incoming orders are effectively split among suitable resting orders. This provides a sense of fairness in that everyone may get some of their order filled. However, a trader who took a risk by being first to place an order (a "market turning" order) at a price may end up having to share an incoming order with a much later submitted order. Furthermore, as a pro rata allocation distributes the incoming order according to a proportion based on the resting order quantities, traders may place orders for large quantities, which they are willing to trade but may not necessarily want to trade, in order to increase the proportion of an incoming order that they will receive. This results in an escalation of quantities on the order book and exposes a trader to a risk that someone may trade against one of these orders and subject the trader to a larger trade than they intended. In the typical case, once an incoming order is allocated against these large resting orders, the traders subsequently cancel the remaining resting quantity which may frustrate other traders. Accordingly, as FIFO and pro rata both have benefits and problems, exchanges may try to use hybrid allocation/matching algorithms which attempt to balance these benefits and problems by combining FIFO and pro rata in some manner. However, hybrid systems define conditions or fixed rules to determine when FIFO should be used and when pro rata should be used. For example, a fixed percentage of an incoming order may be allocated using a FIFO mechanism with the remainder being allocated pro rata.

Traders trading on an exchange including, for example, exchange computer system 100, often desire to trade multiple financial instruments in combination. Each component of the combination may be called a leg. Traders can submit orders for individual legs or in some cases can submit a single order for multiple financial instruments in an exchange-defined combination. Such orders may be called a strategy order, a spread order, or a variety of other names.

A spread instrument may involve the simultaneous purchase of one security and sale of a related security, called legs, as a unit. The legs of a spread instrument may be options or futures contracts, or combinations of the two. Trades in spread instruments are executed to yield an overall net position whose value, called the spread, depends on the difference between the prices of the legs. Spread instruments may be traded in an attempt to profit from the widening or narrowing of the spread, rather than from movement in the prices of the legs directly. Spread instruments are either "bought" or "sold" depending on whether the trade will profit from the widening or narrowing of the spread, respectively. An exchange often supports trading of common spreads as a unit rather than as individual legs, thus ensuring simultaneous execution of the two legs, eliminating the execution risk of one leg executing but the other failing.

One example of a spread instrument is a calendar spread instrument. The legs of a calendar spread instrument differ in delivery date of the underlier. The leg with the earlier occurring delivery date is often referred to as the lead month contract. A leg with a later occurring delivery date is often referred to as a deferred month contract. Another example of a spread instrument is a butterfly spread instrument, which includes three legs having different delivery dates. The delivery dates of the legs may be equidistant to each other. The counterparty orders that are matched against such a combination order may be individual, "outright" orders or may be part of other combination orders.

In other words, an exchange may receive, and hold or let rest on the books, outright orders for individual contracts as well as outright orders for spreads associated with the individual contracts. An outright order (for either a contract or for a spread) may include an outright bid or an outright offer, although some outright orders may bundle many bids or offers into one message (often called a mass quote).

A spread is an order for the price difference between two contracts. This results in the trader holding a long and a short position in two or more related futures or options on futures contracts, with the objective of profiting from a change in the price relationship. A typical spread product includes multiple legs, each of which may include one or more underlying financial instruments. A butterfly spread product, for example, may include three legs. The first leg may consist of buying a first contract. The second leg may consist of selling two of a second contract. The third leg may consist of buying a third contract. The price of a butterfly spread product may be calculated as:

$$\text{Butterfly} = \text{Leg1} - 2 \times \text{Leg2} + \text{Leg3} \qquad \text{(equation 1)}$$

In the above equation, Leg1 equals the price of the first contract, Leg2 equals the price of the second contract and Leg3 equals the price of the third contract. Thus, a butterfly spread could be assembled from two inter-delivery spreads in opposite directions with the center delivery month common to both spreads.

A calendar spread, also called an intra-commodity spread, for futures is an order for the simultaneous purchase and sale of the same futures contract in different contract months (i.e., buying a September CME S&P 500® futures contract and selling a December CME S&P 500 futures contract).

A crush spread is an order, usually in the soybean futures market, for the simultaneous purchase of soybean futures and the sale of soybean meal and soybean oil futures to establish a processing margin. A crack spread is an order for a specific spread trade involving simultaneously buying and selling contracts in crude oil and one or more derivative products, typically gasoline and heating oil. Oil refineries may trade a crack spread to hedge the price risk of their operations, while speculators attempt to profit from a change in the oil/gasoline price differential.

A straddle is an order for the purchase or sale of an equal number of puts and calls, with the same strike price and expiration dates. A long straddle is a straddle in which a long position is taken in both a put and a call option. A short straddle is a straddle in which a short position is taken in both a put and a call option. A strangle is an order for the purchase of a put and a call, in which the options have the same expiration and the put strike is lower than the call strike, called a long strangle. A strangle may also be the sale of a put and a call, in which the options have the same expiration and the put strike is lower than the call strike, called a short strangle. A pack is an order for the simultaneous purchase or sale of an equally weighted, consecutive series of four futures contracts, quoted on an average net change basis from the previous day's settlement price. Packs provide a readily available, widely accepted method for executing multiple futures contracts with a single transaction. A bundle is an order for the simultaneous sale or purchase of one each of a series of consecutive futures contracts. Bundles provide a readily available, widely accepted method for executing multiple futures contracts with a single transaction.

Thus, an exchange may match outright orders, such as individual contracts or spread orders (which as discussed herein could include multiple individual contracts). The exchange may also imply orders from outright orders. For example, exchange computer system 100 may derive, identify and/or advertise, publish, display, or otherwise make available for trading orders based on outright orders.

For example, two different outright orders may be resting on the books or be available to trade or match. The orders may be resting because there are no outright orders that match the resting orders. Thus, each of the orders may wait or rest on the books until an appropriate outright counteroffer comes into the exchange or is placed by a user of the exchange. The orders may be for two different contracts that only differ in delivery dates. It should be appreciated that such orders could be represented as a calendar spread order. Instead of waiting for two appropriate outright orders to be placed that would match the two existing or resting orders, the exchange computer system may identify a hypothetical spread order that, if entered into the system as a tradable spread order, would allow the exchange computer system to match the two outright orders. The exchange may thus advertise or make available a spread order to users of the exchange system that, if matched with a tradable spread order, would allow the exchange to also match the two resting orders. Thus, the match engine is configured to detect that the two resting orders may be combined into an order in the spread instrument and accordingly creates an implied order.

In other words, the exchange's matching system may imply the counteroffer order by using multiple orders to create the counteroffer order. Examples of spreads include implied IN, implied OUT, 2nd- or multiple-generation, crack spreads, straddle, strangle, butterfly, and pack spreads. Implied IN spread orders are derived from existing outright orders in individual legs. Implied OUT outright orders are derived from a combination of an existing spread order and an existing outright order in one of the individual underlying legs. Implied orders can fill in gaps in the market and allow spreads and outright futures traders to trade in a product where there would otherwise have been little or no available bids and asks.

For example, implied IN spreads may be created from existing outright orders in individual contracts where an outright order in a spread can be matched with other outright orders in the spread or with a combination of orders in the legs of the spread. An implied OUT spread may be created from the combination of an existing outright order in a spread and an existing outright order in one of the individual underlying leg. An implied IN or implied OUT spread may be created when an electronic match system simultaneously works synthetic spread orders in spread markets and synthetic orders in the individual leg markets without the risk to the trader/broker of being double filled or filled on one leg and not on the other leg.

By linking the spread and outright markets, implied spread trading increases market liquidity. For example, a buy in one contract month and an offer in another contract month in the same futures contract can create an implied market in the corresponding calendar spread. An exchange may match an order for a spread product with another order for the spread product. Some existing exchanges attempt to match orders for spread products with multiple orders for legs of the spread products. With such systems, every spread product contract is broken down into a collection of legs and an attempt is made to match orders for the legs. Examples of implied spread trading include those disclosed in U.S. Patent Publication No. 2005/0203826, entitled "Implied Spread Trading System," the entire disclosure of which is incorporated by reference herein and relied upon. Examples of implied markets include those disclosed in U.S. Pat. No. 7,039,610, entitled "Implied Market Trading System," the entire disclosure of which is incorporated by reference herein and relied upon.

As an intermediary to electronic trading transactions, the exchange bears a certain amount of risk in each transaction that takes place. To that end, the clearing house implements risk management mechanisms to protect the exchange. One or more of the modules of the exchange computer system 100 may be configured to determine settlement prices for constituent contracts, such as deferred month contracts, of spread instruments, such as for example, settlement module 142.

One or more of the above-described modules of the exchange computer system 100 may be used to gather or obtain data to support the settlement price determination, as well as a subsequent margin requirement determination. For example, the order book module 110 and/or the market data module 112 may be used to receive, access, or otherwise obtain market data, such as bid-offer values of orders currently on the order books. The trade database 108 may be used to receive, access, or otherwise obtain trade data indicative of the prices and volumes of trades that were recently executed in a number of markets. In some cases, transaction data (and/or bid/ask data) may be gathered or obtained from open outcry pits and/or other sources and incorporated into the trade and market data from the electronic trading system(s).

In some cases, the outright market for the deferred month or other constituent contract may not be sufficiently active to provide market data (e.g., bid-offer data) and/or trade data. Spread instruments involving such contracts may nonetheless be made available by the exchange. The market data from the spread instruments may then be used to determine a settlement price for the constituent contract. The settlement price may be determined, for example, through a boundary constraint-based technique based on the market data (e.g., bid-offer data) for the spread instrument, as described in U.S. Patent Publication No. 2015/0073962 entitled "Boundary Constraint-Based Settlement in Spread Markets" ("the '962 Publication"), the entire disclosure of which is incorporated by reference herein and relied upon. Settlement price determination techniques may be implemented to cover calendar month spread instruments having different deferred month contracts.

Figure 4A:
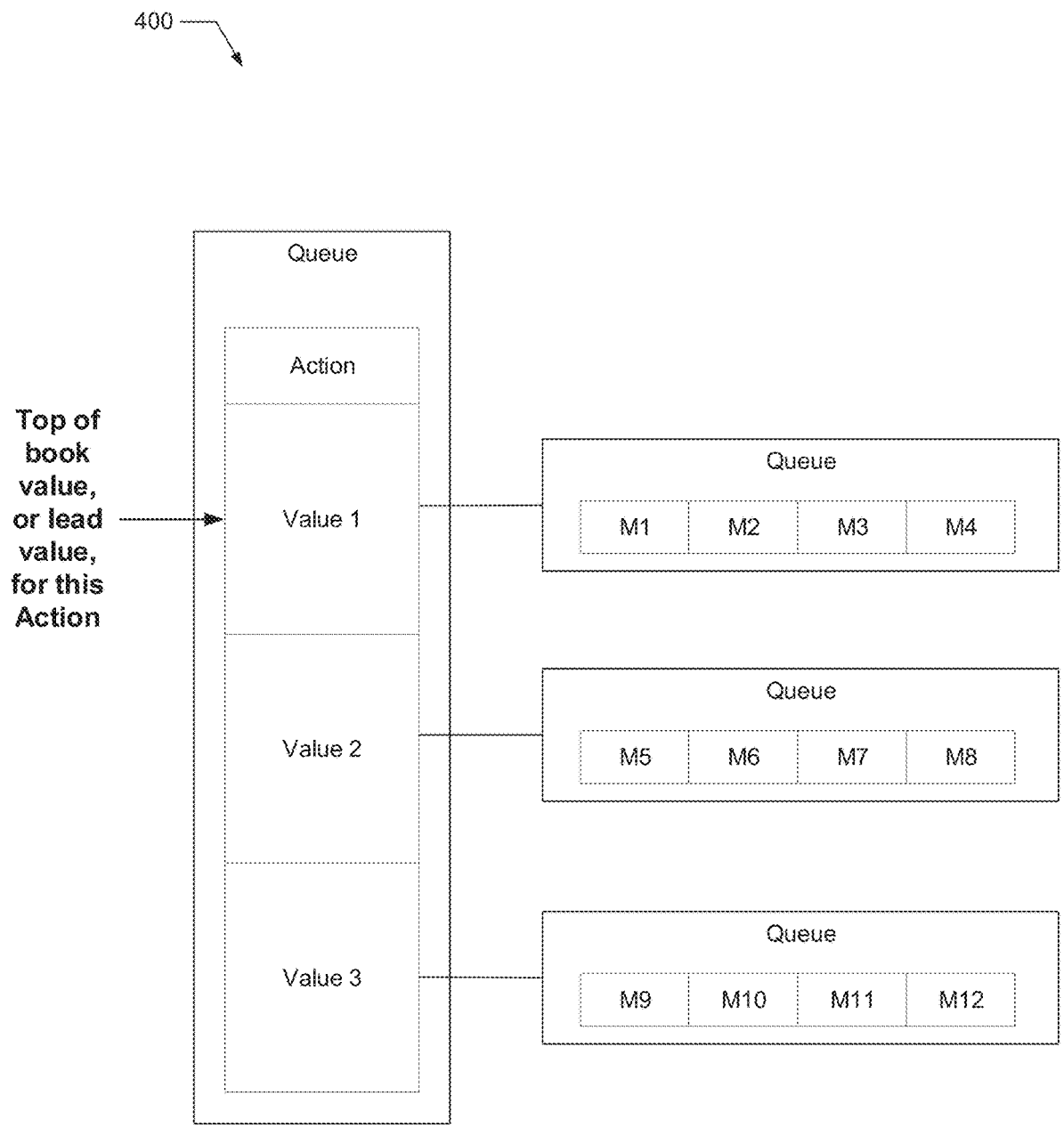
FIG. 4A depicts an illustrative embodiment of a data structure used to implement aspects of the disclosed embodiments.

In one embodiment, the messages and/or values received for each object may be stored in queues according to value and/or priority techniques implemented by an exchange computing system 100. FIG. 4A illustrates an example data structure 400, which may be stored in a memory or other storage device, such as the memory 204 or storage device 206 described above with respect to FIG. 2, for storing and retrieving messages related to different values for the same action for an object. For example, data structure 400 may be a set of queues or linked lists for multiple values for an action, e.g., bid, on an object. Data structure 400 may be implemented as a database. It should be appreciated that the system may store multiple values for the same action for an object, for example, because multiple users submitted messages to buy specified quantities of an object at different values. Thus, in one embodiment, the exchange computing system can keep track of different orders or messages for buying or selling quantities of objects at specified values.

Although the application contemplates using queue data structures for storing messages in a memory, the implementation may involve additional pointers, i.e., memory address pointers, or linking to other data structures. Incoming messages may be stored at an identifiable memory address. The transaction processor can traverse messages in order by pointing to and retrieving different messages from the different memories. Thus, messages that may be depicted sequentially, e.g., in FIG. 4B described below, may actually be stored in memory in disparate locations. The software programs implementing the transaction processing may retrieve and process messages in sequence from the various disparate (e.g., random) locations. Thus, in one embodiment, each queue may store different values, which could represent prices, where each value points to or is linked to the messages (which may themselves be stored in queues and sequenced according to priority techniques, such as prioritizing by value) that will match at that value. For example, as shown in FIG. 4A, all of the values relevant to executing an action at different values for an object are stored in a queue. Each value in turn points to, e.g., a linked list or queue logically associated with the values. The linked list stores the messages that instruct the exchange computing system to buy specified quantities of the object at the corresponding value.

The sequence of the messages in the message queues connected to each value may be determined by exchange implemented priority techniques. For example, in FIG. 4A, messages M1, M2, M3 and M4 are associated with performing an action (e.g., buying or selling) a certain number of units (may be different for each message) at Value 1. M1 has priority over M2, which has priority over M3, which has priority over M4. Thus, if a counter order matches at Value 1, the system fills as much quantity as possible associated with M1 first, then M2, then M3, and then M4.

In the illustrated examples, the values may be stored in sequential order, and the best or lead value for a given queue may be readily retrievable by and/or accessible to the disclosed system. Thus, in one embodiment, the value having the best priority may be illustrated as being in the topmost position in a queue, although the system may be configured to place the best priority message in some other predetermined position. In the example of FIG. 4A, Value 1 is shown as being the best value or lead value, or the top of the book value, for an example Action.

Figure 4B:
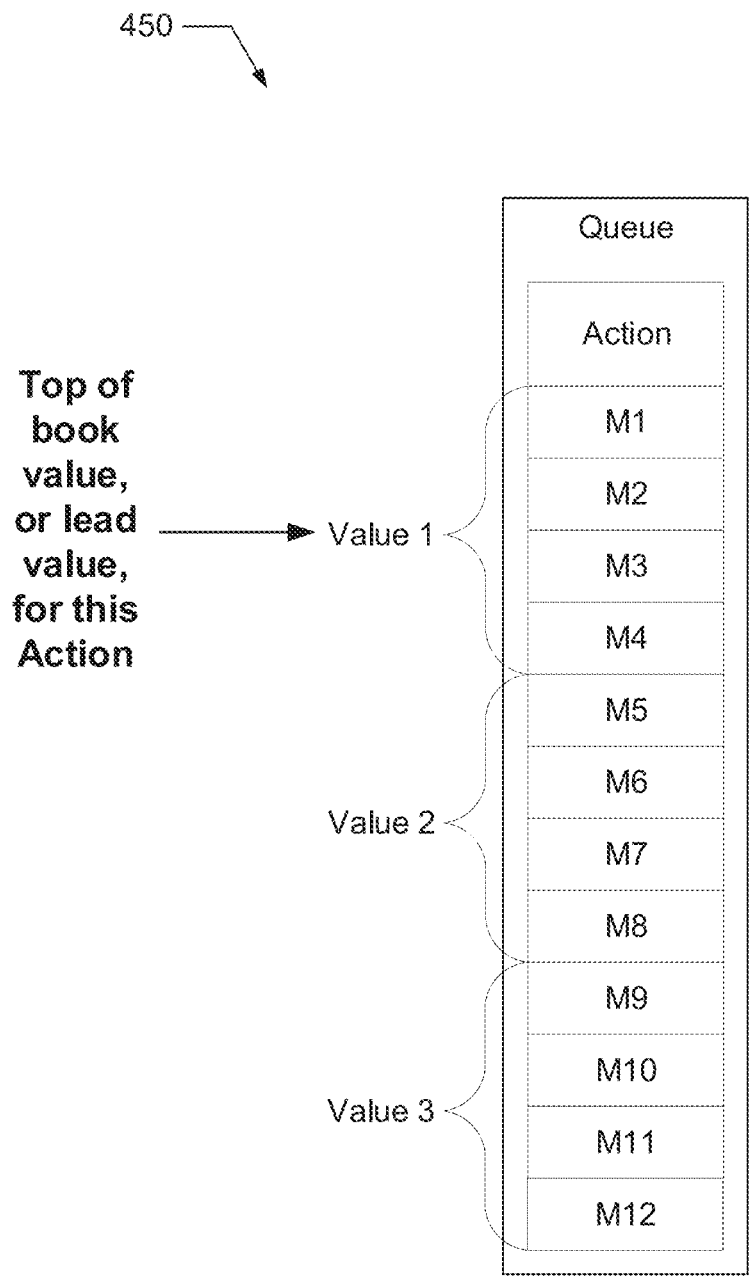
FIG. 4B depicts an illustrative embodiment of an alternative data structure used to implement aspects of the disclosed embodiments.

FIG. 4B illustrates an example alternative data structure 450 for storing and retrieving messages and related values. It should be appreciated that matches occur based on values, and so all the messages related to a given value may be prioritized over all other messages related to a different value. As shown in FIG. 4B, the messages may be stored in one queue and grouped by values according to the hierarchy of the values. The hierarchy of the values may depend on the action to be performed.

For example, if a queue is a sell queue (e.g., the Action is Sell), the lowest value may be given the best priority and the highest value may be given the lowest priority. Thus, as shown in FIG. 4B, if Value 1 is lower than Value 2 which is lower than Value 3, Value 1 messages may be prioritized over Value 2, which in turn may be prioritized over Value 3.

Within Value 1, M1 is prioritized over M2, which in turn is prioritized over M3, which in turn is prioritized over M4. Within Value 2, M5 is prioritized over M6, which in turn is prioritized over M7, which in turn is prioritized over M8. Within Value 3, M9 is prioritized over M10, which in turn is prioritized over M11, which in turn is prioritized over M12.

Alternatively, the messages may be stored in a tree-node data structure that defines the priorities of the messages. In one embodiment, the messages may make up the nodes.

In one embodiment, the system may traverse through a number of different values and associated messages when processing an incoming message. Traversing values may involve the processor loading each value, checking that value, and deciding whether to load another value, i.e., by accessing the address pointed at by the address pointer value. In particular, referring to FIG. 4B, if the queue is for selling an object for the listed Values 1, 2 and 3 (where Value 1 is lower than Value 2 which is lower than Value 3), and if the system receives an incoming aggressing order to buy quantity X at a Value 4 that is greater than Values 1, 2, and 3, the system will fill as much of quantity X as possible by first traversing through the messages under Value 1 (in sequence M1, M2, M3, M4). If any of the quantity of X remains, the system traverses down the prioritized queue until all of the incoming order is filled (e.g., all of X is matched) or until all of the quantities of M1 through M12 are filled. Any remaining, unmatched quantity remains on the books, e.g., as a resting order at Value 4, which was the entered value or the message's value.

The system may traverse the queues and check the values in a queue, and upon finding the appropriate value, may locate the messages involved in making that value available to the system. When an outright message value is stored in a queue, and when that outright message is involved in a trade or match, the system may check the queue for the value, and then may check the data structure storing messages associated with that value.

In one embodiment, an exchange computing system may convert all financial instruments to objects. In one embodiment, an object may represent the order book for a financial instrument. Moreover, in one embodiment, an object may be defined by two queues, one queue for each action that can be performed by a user on the object. For example, an order book converted to an object may be represented by an Ask queue and a Bid queue. Resting messages or orders associated with the respective financial instrument may be stored in the appropriate queue and recalled therefrom.

In one embodiment, the messages associated with objects may be stored in specific ways depending on the characteristics of the various messages and the states of the various objects in memory. For example, a system may hold certain resting messages in queue until the message is to be processed, e.g., the message is involved in a match. The order, sequence or priority given to messages may depend on the characteristics of the message. For example, in certain environments, messages may indicate an action that a computer in the system should perform. Actions may be complementary actions or require more than one message to complete. For example, a system may be tasked with matching messages or actions contained within messages. The messages that are not matched may be queued by the system in a data queue or other structure, e.g., a data tree having nodes representing messages or orders.

The queues are structured so that the messages are stored in sequence according to priority. Although the embodiments are disclosed as being implemented in queues, it should be understood that different data structures such as for example linked lists or trees may also be used.

The system may include separate data structures, e.g., queues, for different actions associated with different objects within the system. For example, in one embodiment, the system may include a queue for each possible action that can be performed on an object. The action may be associated with a value. The system prioritizes the actions based in part on the associated value.

Figure 4C:
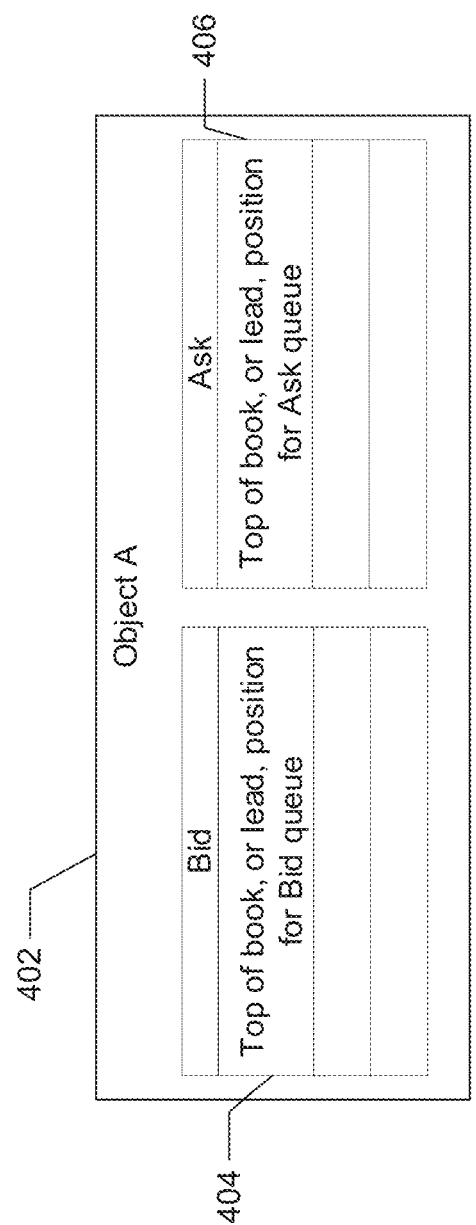
FIG. 4C depicts an illustrative embodiment of order book data structures storing example messages used to implement aspects of the disclosed embodiments.

For example, as shown in FIG. 4C, the order book module of a computing system may include several paired queues, such as queues Bid and Ask for an object 402 (e.g., Object A). The system may include two queues, or one pair of queues, for each object that is matched or processed by the system. In one embodiment, the system stores messages in the queues that have not yet been matched or processed. FIG. 4C may be an implementation of the data structures disclosed in FIGS. 4A and/or 4B. Each queue may have a top of book, or lead, position, such as positions 404 and 406, which stores data that is retrievable.

The queues may define the priority or sequence in which messages are processed upon a match event. For example, two messages stored in a queue may represent performing the same action at the same value. When a third message is received by the system that represents a matching action at the same value, the system may need to select one of the two waiting, or resting, messages as the message to use for a match. Thus, when multiple messages can be matched at the same value, the exchange may have a choice or some flexibility regarding the message that is matched. The queues may define the priority in which orders that are otherwise equivalent (e.g., same action for the same object at the same value) are processed.

The system may include a pair of queues for each object, e.g., a bid and ask queue for each object. Each queue may be for example implemented utilizing the data structure of FIG. 4B. The exchange may be able to specify the conditions upon which a message for an object should be placed in a queue. For example, the system may include one queue for each possible action that can be performed on an object. The system may be configured to process messages that match with each other. In one embodiment, a message that indicates performing an action at a value may match with a message indicating performing a corresponding action at the same value. Or, the system may determine the existence of a match when messages for the same value exist in both queues of the same object.

The messages may be received from the same or different users or traders.

The queues illustrated in FIG. 4C hold or store messages received by a computing exchange, e.g., messages submitted by a user to the computing exchange, and waiting for a proper match. It should be appreciated that the queues may also hold or store implieds, e.g., implied messages generated by the exchange system, such as messages implied in or implied out as described herein. The system thus adds messages to the queues as they are received, e.g., messages submitted by users, or generated, e.g., implied messages generated by the exchanges. The sequence or prioritization of messages in the queues is based on information about the messages and the overall state of the various objects in the system.

When the data transaction processing system is implemented as an exchange computing system, as discussed above, different client computers submit electronic data transaction request messages to the exchange computing system. Electronic data transaction request messages include requests to perform a transaction on a data object at a value for a quantity. The exchange computing system includes a transaction processor, e.g., a hardware matching processor or match engine, that matches, or attempts to match, pairs of messages with each other. For example, messages may match if they contain counter instructions (e.g., one message includes instructions to buy, the other message includes instructions to sell) for the same product at the same value. In some cases, depending on the nature of the message, the value at which a match occurs may be the submitted value or a better value. A better value may mean higher or lower value depending on the specific transaction requested. For example, a buy order may match at the submitted buy value or a lower (e.g., better) value. A sell order may match at the submitted sell value or a higher (e.g., better) value.

A new order or message type allows client computers to submit electronic data transaction request messages that may include at least a quarantine flag and two values. In one embodiment, the quarantine flag may be set or un-set. In one embodiment, the quarantine flag may be a field that can be set to one of two different settings, e.g., Yes or No, or 1 or 0, where one setting indicates that the message should be quarantined, e.g., delayed, and the other setting indicates that the message should not be quarantined. In one embodiment, if the quarantine flag is set, the message is delayed. If the quarantine flag is not set, the message is not delayed. After a message having a quarantine flag set undergoes a delay, the message is then released, e.g., is allowed to progress to the transaction processor.

In the disclosed embodiments, messages may also contain two values at which to perform the requested transaction: a base (i.e., primary) value and an improved value. Based on the other messages received by the exchange computing system, a message may match another message at the base (i.e., primary) value, or at the improved value.

Figure 5:
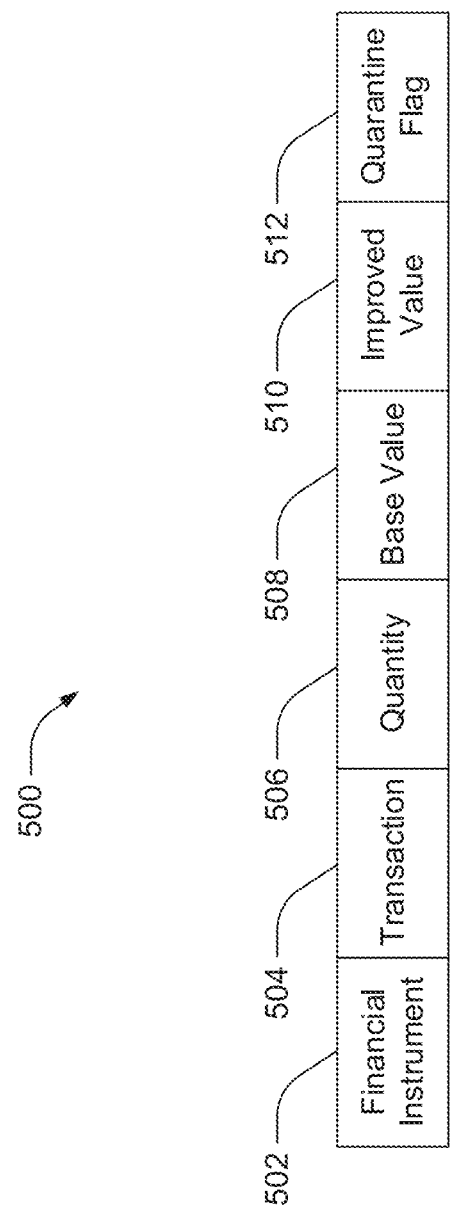
FIG. 5 depicts an example electronic data transaction request message type used to implement aspects of the disclosed embodiments.

FIG. 5 illustrates an example embodiment of a new order type 500 used in conjunction with the disclosed embodiments. As shown in FIG. 5, order type 500 includes a field 502 specifying the financial instrument on which the submitting client computer wishes to perform a transaction, a field 504 specifying the transaction to be performed, a field 506 specifying the quantity to be transacted, a field 508 specifying the base value at which the quantity should be transacted, a field 510 specifying the improved value at which the quantity should be transacted, and a field 512 specifying a quarantine flag which controls whether the message should be delayed before being processed by the transaction processor. Some of the fields in order type 500 may be mandatory (e.g., the financial instrument field, the transaction field), whereas other fields may be optional (e.g., the improved value field, the quarantine flag field). A message having the quarantine field set, e.g., field 512, is delayed or held by a network router or a quarantine system.

In one embodiment, if an electronic data transaction request message using order type 500 does not specify two values, e.g., does not specify both a base value and an improved value, but instead only specifies one value, the one value may be considered to be the base value.

The quarantine field and the improved value field are independent, meaning a client computer can elect to use either field, both fields, or neither field. Client computers may set the disclosed order type 500 in a variety of combinations, possibly resulting in different delays experienced by the order and/or different price matches, resulting in a variety of message types.

For example, a first message may not accept a delay via the quarantine field and may not offer an improved value in addition to the base value. In other words, the first message may not use any of the new fields of the disclosed order type 500. The first message may simply be routed and matched like previous message types.

A second message may not accept a delay via the quarantine field but may offer an improved value in addition to the base value. The second message may be routed directly to the transaction processor without an imposed delay as before and can match at one or both of the two included values (depending on the quantities matched at either value). For example, a market maker may be willing to offer an improved value to counterparties that take on a delay (i.e., by setting their respective quarantine fields).

A third message may accept a delay via the quarantine field, but may only include one base value, and may not offer an improved value. The third message may pass through the quarantine system where it experiences a delay, and then be routed to the transaction processor. The transaction processor matches the third message at the base value, which could be some other message's improved value. For example, a trader may accept a delay in order to possibly receive the benefit of a counterparty's improved value which matches with the trader's base value.

A fourth message may accept a delay via the quarantine field and may also offer an improved value in addition to the base value. The fourth message may pass through the quarantine system where it experiences a delay, and then be routed to the transaction processor. The transaction processor may match the fourth message one or both of the two included values (depending on the quantities matched at either value). For example, a trader may accept a delay in order to possibly receive the benefit of a counterparty's improved value and may be willing to offer an improved value to counterparties that take on a delay (i.e., by setting their respective quarantine fields).

Accordingly, the disclosed order type 500 includes an additional value field (i.e., the improved value field), and a quarantine field. The exchange computing system may store and consider these additional fields when evaluating whether messages match each other. Thus, the data structure associated with messages processed by the data transaction processing system may include a field for setting whether the message should be quarantined, e.g., for 10 microseconds, before being processed by the transaction processor, and a field for specifying an improved value that is only available to counter messages that have themselves agreed to accept a quarantined delay.

Figure 6A:
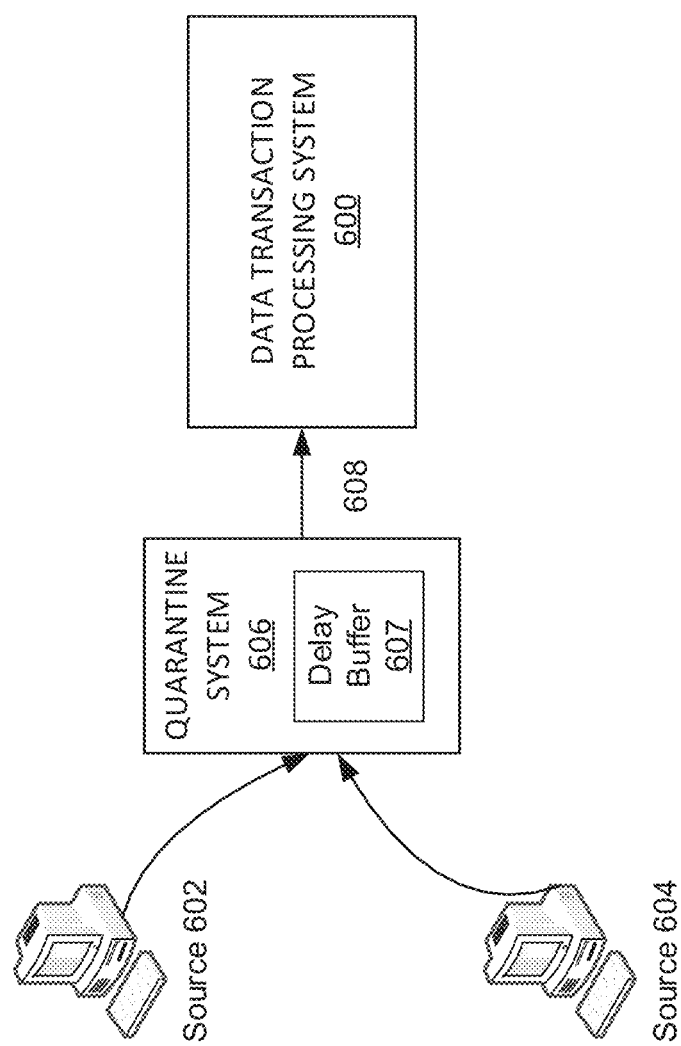
FIG. 6A depicts an example block diagram representing aspects of the disclosed embodiments.

FIG. 6A illustrates an example data transaction processing system 600. The data transaction processing system may be an exchange computing system. System 600 may include, be the same as, or be similar to, system 100 described above, and may be configured to receive messages from sources, e.g., client computers or sources 602 and 604, over a network.

The data transaction processing system 600 includes, or is in communication with, a quarantine system 606 that determines whether a message should be delayed based on the message's quarantine field. Quarantine system 606 may include buffer 607 which may be used to hold or delay quarantined messages, before the message is transmitted to data transaction processing system 600 via path 608.

In some implementations, the quarantine system 606 may be a part of the exchange computing system, e.g., located physically or logically at, or adjacent to, the ingress, as defined above, of data transaction processing system 600. The quarantine system 606 may be implemented as a network router, so that a router along the data path from the client computer to the data transaction processing system can delay messages as described herein. The quarantine system 606 may be implemented at any point along a data path from a client computer to a transaction processor within the data transaction processing system. In one embodiment, the closer (physically and/or logically) the quarantine system 606 is to the exchange computing system, the more traffic submitted to the exchange computing system may be routed through the quarantine system. In one embodiment, the quarantine system may be implemented in multiple different routers at the client computers.

The quarantine system 606 initially processes messages, e.g., checks if the quarantine field of a message is set to Yes, and if so, holds the message, or delays messages from being processed. The delay may be implemented by setting a timer associated with the delayed message. Upon expiration of the delay, the quarantine system releases the message, i.e., allows the message to proceed and be routed to the data transaction processing system.

The quarantine system reduces network congestion by delaying some of the incoming messages. If a message's quarantine field is set, the quarantine system delays or holds that message for a period of time before forwarding or allowing the message to be routed to the data transaction processing system. A data transaction processing system, such as an exchange computing system implemented by the CME, may receive millions of electronic data transaction request messages per day, including hundreds or thousands of electronic data transaction request messages per minute. Typically, client computers submitting electronic data transaction request messages desire the quickest execution. The disclosed embodiments, however, enable delayed electronic data transaction request messages to receive a transactional benefit, as discussed in more detail herein. During periods of peak messaging, the data transaction processing system may receive hundreds of messages per microsecond. The quarantine system delays or buffers at least some of the incoming messages, namely, the electronic data transaction request messages that have self-identified themselves, e.g., through the quarantine flag, as a message that should be delayed. By delaying some of the messages, the quarantine system is able to reduce the amount of traffic that is concurrently routed to the exchange computing system. The exchange computing system in turn can thereby receive and process fewer messages per microsecond. The rate of message inflow to the data transaction processing system is reduced due to the quarantine system holding, or delaying, at least some of the electronic data transaction request messages.

The disclosed embodiments allow client computers to modify, namely, reduce, the priority given to certain messages, in exchange for the possibility of matching at a better value. Thus, the disclosed order type 500 may allow traders to self-de-prioritize their messages. As should be apparent, self-de-prioritization refers to a trader reducing the priority or time at which his/her message is received and/or processed by the exchange computing system.

It should be appreciated that the network congestion reduction and processing improvements enabled by the disclosed embodiments depend in part on whether the new fields of the disclosed order type are utilized by traders submitting the electronic data transaction request messages. Bandwidth optimization occurs upon a number of the electronic data transaction request messages being delayed so that instead of all the electronic data transaction request messages routing through the available data paths, some of the messages are held back. In turn, the number of electronic data transaction request messages agreeing to accept a delay, e.g., by setting the message quarantine field, increases as traders realize, over time, transaction benefits to accepting a delay. The transaction benefits, e.g., matching counter messages at improved values, in turn depend on the number of traders submitting orders including improved values in addition to base values. Accordingly, the network utilization and processing latency improvements described herein may be the result of behavioral changes in traders, which may be triggered by offering a system where improved execution can be realized by accepting delayed processing.

As traders, e.g., market makers, submit a large quantity of orders including both base values and improved values, the presence of a substantial number of improved values may incentivize other traders to submit quarantined messages. A large number of quarantined messages increases network utilization improvement opportunities, and also increases the data transaction processing system's flexibility in imposing the delays advantageously, e.g., by delaying processing of electronic data transaction request messages during peak times to later, less active times.

Referring back to FIG. 6A, although sources 602 and 604 are illustrated, it should be appreciated that a data transaction processing system may receive electronic data transaction request messages from hundreds or thousands of client computers or sources. The quarantine system accordingly receives messages collectively from all of the various sources. The quarantine system receives all of the electronic data transaction request messages, identifies the messages that have set a quarantine flag, and delays those messages having set the quarantine flag and immediately routes, e.g., without imposing a delay, those messages not having set the quarantine flag. Accordingly, the input rate of electronic data transaction request messages per microsecond into the quarantine system may be substantially higher than the output rate of electronic data transaction request messages per microsecond out of the quarantine system.

All electronic data transaction request messages, even delayed electronic data transaction request messages (i.e., messages having set the quarantine flag, or alternatively marking the quarantine field 512 indicating the message should be delayed), eventually are routed to the data transaction processing system, which includes a hardware matching processor and which attempts to match messages with messages counter thereto.

Upon receiving electronic data transaction request messages, the transaction processor determines if a message's quarantine field is set. A message having the quarantine flag indicates the message experienced a delay via the quarantine system. A message having the quarantine flag may be considered to be a delayed message or quarantined message. The transaction processor allows a quarantined message to match with another message's improved value. The transaction processor also allows a quarantined message to match with another message's base value. However, a message's improved value may only be used to match with a previously quarantined message. Thus, a client computer submitting an electronic data transaction request message may elect to include an improved value that is only available to, or can only match with, a quarantined message, i.e., a previously quarantined message. Thus, the ability to match with an improved value may be an incentive for a client computer to submit a message with a quarantine flag. By accepting a delay in the quarantine system, the delayed or quarantined message is allowed to match with improved values which may not have otherwise been available for matching with that message. It should be appreciated that by the time a message is routed to the transaction processor, the transaction processor can determine if the message was previously quarantined by the quarantine system, i.e., whether the message should be considered a quarantined message.

The quarantine system accordingly modifies the priority of messages that are submitted to the exchange computing system. Typical exchange computing systems attempt to process messages in the order of receipt. The transaction processor algorithm may, as described above, modify the priority of messages when matching, e.g., see pro-rata matching algorithms. The disclosed embodiments modify the priority of message receipt by the transaction processor. A first message that is submitted before a second message may nevertheless be received by the transaction processor/exchange computing system after the second message, if the first message's quarantine field is set to accept a delay and the second message's quarantine field is not set to accept a delay. In cases where the imposed delay is randomized, e.g., different quarantined messages experience different delays, an earlier-submitted delayed message may be received by the transaction processor after a later-submitted delayed message.

Figure 6B:
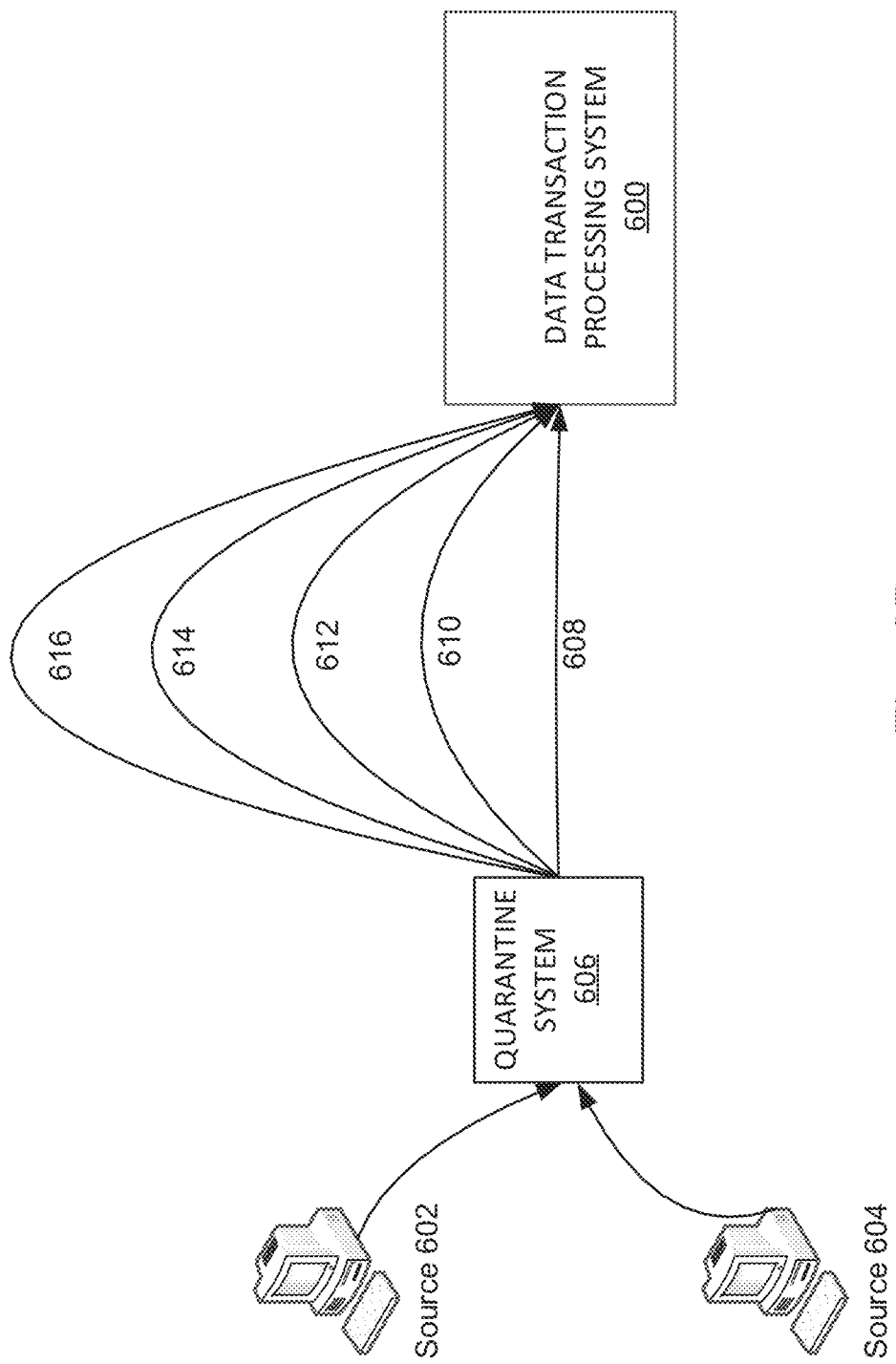
FIG. 6B depicts another example block diagram representing aspects of the disclosed embodiments.

The delay may be implemented by re-routing the quarantined message through a path of fixed length. To randomize the delay imposed on a message, the quarantine system may be coupled to the exchange computing system via multiple paths of different lengths. As shown in FIG. 6B, quarantine system 606 is coupled to data transaction processing system 600 via paths 608, 610, 612, 614, 616, each of known, differing lengths. In the example of FIG. 6B, path 616 is longer than path 614, which is longer than path 612, which is longer than path 610, which is longer than path 608. The longer the path, the more time is needed for a message to traverse that path. Path 608 may be the shortest/quickest path from quarantine system 606 to data transaction processing system 600. For example, a message or data packet may be routed from quarantine system 606 to data transaction processing system 600 via path 608 in 1 microsecond. The same message or data packet may require 2 microseconds to travel from quarantine system 606 to data transaction processing system 600 via path 610. The same message or data packet may require 4 microseconds to travel from quarantine system 606 to data transaction processing system 600 via path 612. The same message or data packet may require 7 microseconds to travel from quarantine system 606 to data transaction processing system 600 via path 614. The same message or data packet may require 10 microseconds to travel from quarantine system 606 to data transaction processing system 600 via path 616. Upon detecting that an incoming message has its quarantine flag set, the quarantine system may randomly select one of paths 610, 612, 614, or 616 via which to route the incoming message. An incoming message not having a quarantine flag may be routed through the quickest path 608.

The quarantine system may accordingly be implemented to reduce the effects of high message volume. During periods of high message volume, messages essentially compete for network resources. The quarantine system offloads or re-routes selected (quarantined) messages so that available network resources are used to transmit a smaller number of messages, improving the network utilization, and decreasing network traffic at a specific point in time. Although the overall number of messages processed over a window of time remains the same, the rate at which messages are processed may be smoothed out.

FIG. 6C illustrates plot 650 depicting the number of messages received by the transaction processor from time t0 to t3 when the disclosed quarantine system is not implemented. In other words, plot 650 shows incoming message traffic as received by the transaction processor, where none of the messages experience an imposed delay. As shown in FIG. 6C, the transaction processor may receive bursts of traffic, including message volume peaks 652 and 654 received at times t1 and t2, respectively. The bursty nature of incoming messages is often unpredictable, and high messaging volume may cause the transaction processor to become overloaded, resulting in longer response times, especially during peak messaging times t1 and t2. Peaks 652 and 654 may approach a maximum processing capacity of the transaction processor, illustrated in FIG. 6C as line 660.

The quarantine system 606 may, in one embodiment, smooth out, or distribute, the incoming message flow to reduce the magnitude of messages received at any one time. FIG. 6C also illustrates plot 670 depicting messages received by the transaction processor from time t0 to t3 after the messages have been routed through a networking apparatus implementing the disclosed quarantine system. In other words, plot 670 shows incoming message traffic as received by the transaction processor, where some of the messages experienced a delay imposed by the quarantine system.

For both plots 650 and 670, the rate and number of messages submitted by client computers is the same. The only difference is that for plot 670, the quarantine system reshapes/re-distributes the incoming messages, so that the messages processed by the transaction processor are more uniform than what is actually received by the quarantine system. The total number of messages submitted to the data transaction processing system in both instances from time t0 to t3 is the same. As shown in FIG. 6C, the message flow over time in plot 670 is more evenly distributed. For instance, the quarantine system may impose different delays on different messages such that the maximum load on the transaction processor at any one given time is reduced. Peaks 672 and 674 show volume peaks received at times t1 and t2, respectively, and correspond to peaks 652 and 654, respectively. A data transaction processing system implementing the disclosed quarantine system 606 accordingly provides better processing performance than a data transaction processing system without the disclosed quarantine system 606.

By imposing a delay that can vary, e.g., based on current processing latency, or on current network conditions, the quarantine system 606 increases the flexibility and responsiveness of the data transaction processing system. For example, the quarantine system 606 may delay messages during peak messaging/activity times of the day to later times and continue delaying processing of a percentage of messages until a slower period of activity is reached. During a lull or slow period, the quarantine system 606 may then release a large amount of messages to take advantage of the slow activity time. The quarantine system 606 can accordingly be implemented to transfer or distribute work over different time periods. The quarantine system 606 increases the flexibility with which workload can be offset and distributed.

In one embodiment, the delay may be imposed by rejecting the transaction and negotiating a retransmission time with the sender at the TCP/IP level.

Figure 7A:
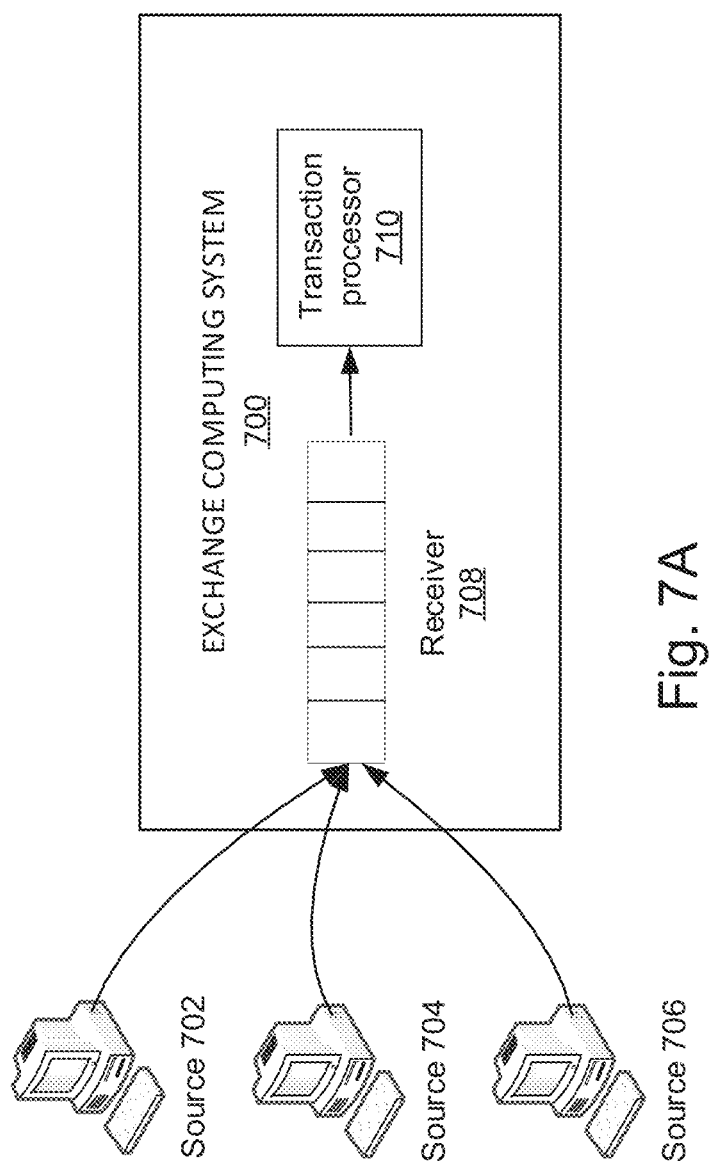
FIGS. 7A and 7B illustrate example exchange computing systems.

Moving the network processing of delayed messages away from a FIFO model may allow the exchange computing system to implement high-speed parallel processing for message receipt. For example, as shown in FIG. 7A, an exchange computing system 700 may ordinarily queue messages upon receipt, upon which queuing the messages reach the transaction processor in a fixed order. In particular, sources 702, 704 and 706 submit electronic data transaction request messages to the exchange computing system 700. The messages are initially processed by receiver 708, which implements a FIFO queue that orders the messages in the order of receipt. Receiver 708 forwards the ordered messages to transaction processor for processing, e.g., matching. The receiver 708 may be physically or logically located within the exchange computing system or outside of the exchange computing system, for example, between the sources and the exchange computing system. For more details on ordering incoming messages received by an exchange computing system, see the '516 Publication.

Figure 7B:
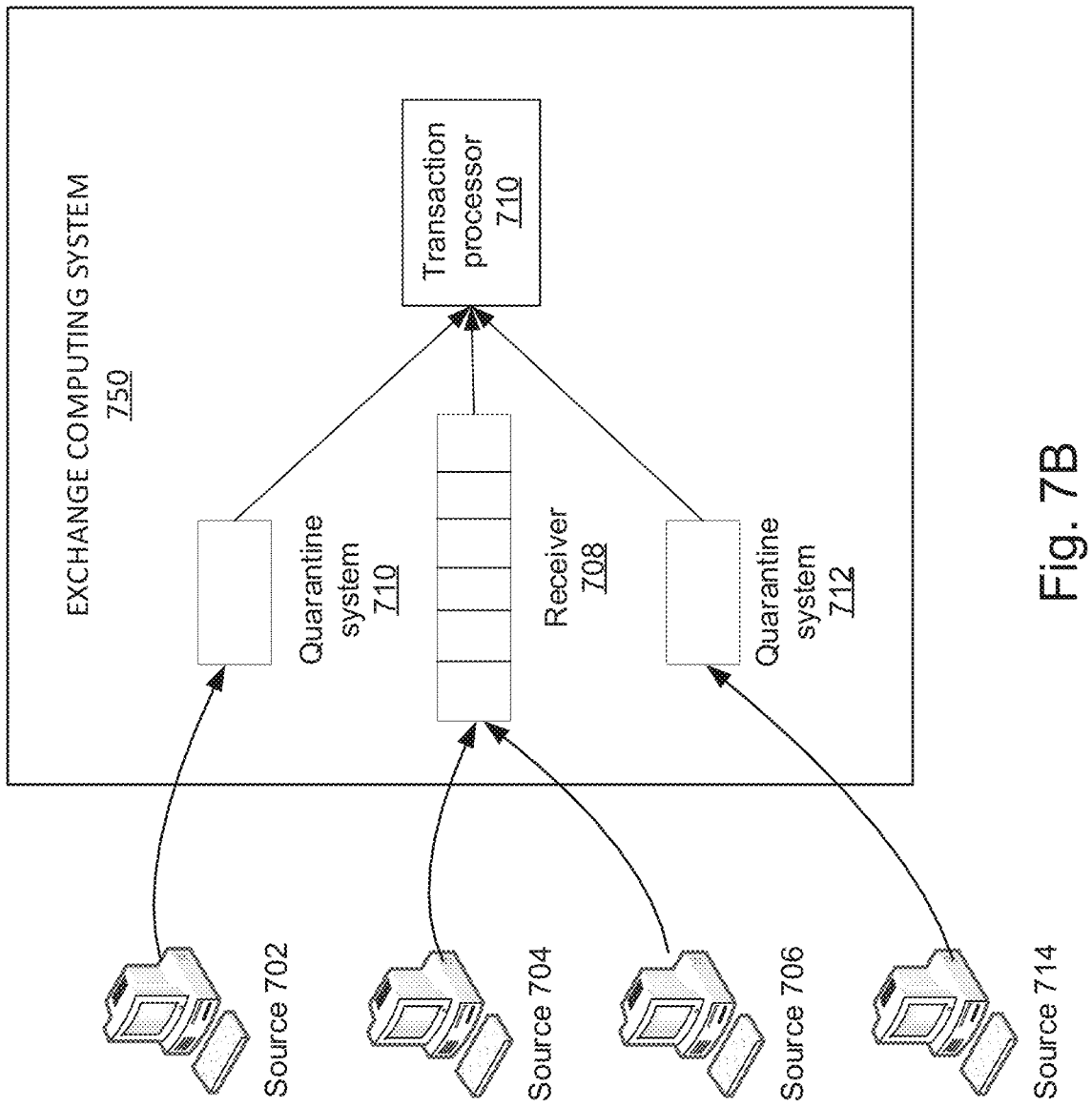

By implementing the disclosed quarantine system, the exchange computing system may be able to implement multiple parallel receiving queues. As shown in FIG. 7B, an exchange computing system 750 may include multiple quarantine systems 710 and 712, in addition to the FIFO receiver 708. Messages with a quarantine flag are received by the quarantine systems 710 and 712. Alternatively, the system may include only one quarantine system that receives/delays all quarantined messages. Messages without a quarantine flag are received by the receiver 708 and processed sequentially. The exchange computing system accordingly can include multiple systems, namely, 708, 710 and 712 that can receive incoming messages. The deciding factor whether a message is routed through a quarantine system or the FIFO receiver is whether a message has de-prioritized itself via the quarantine field. Exchange computing system 750 can experience a higher level of processing throughput by reducing the effects of a bottleneck on a single receiving system. By removing the requirement that all messages be processed in the order of receipt, the exchange computing system 750 can process/receive multiple messages in parallel. In other words, the quarantine field allows client computers to specify if their messages can be delayed before processing. The exchange computing system accordingly no longer processes each message in the exact order it was received. The delayed messages can be processed at different times, e.g., each one delayed by a different amount. The exchange computing system can accordingly simultaneously or concurrently process different messages because some of the messages (i.e., the quarantined messages) can be processed out of turn. The exchange computing system can for example, run a separate thread that generates unique order ID numbers as soon as messages are received by the exchange computing system. When a delayed message is eventually forwarded to the transaction processor, some of the processing associated with a message and normally performed by the transaction processor may already be completed, so that a delayed message is processed more quickly by the transaction processor.

The transaction processor accordingly receives delayed and undelayed messages, as well as messages with only base values, as well as both base and improved values. The transaction processor matches messages based on whether the messages were quarantined and/or included an improved value.

As discussed herein, the quarantine system may be implemented within the exchange computing system, or it may be implemented outside of the exchange computing system. In the examples associated with FIGS. 8 through 17, the quarantine system is implemented, and located (physically and logically) within the exchange computing system.

FIG. 8 illustrates an example order book object 800, which may represent the state of an electronic marketplace associated with a financial instrument. As discussed with respect to FIG. 4A to 4C, the Bid and Ask queues may correspond to requests to perform transactions. A position field identifies to position of each entry within each queue. An entry can accordingly be referenced by its position and queue name, e.g., position 3 in the Ask queue. The transaction field 504 may be used to specify whether the request is to purchase (buy) or relinquish (sell) a quantity (field 506) of the financial instrument (field 502) corresponding to the object 800. The state of object 800 may be initially blank (e.g., reset to zero at the beginning of a trading week), and each order that is submitted to and processed by the corresponding transaction processor results in a modification to the state of the object 800. Orders submitted with two values, e.g., a base value and an improved value, may be stored in the data structure associated with object 800 as two separate records or entries. Improved values are marked with an asterisk (*) or otherwise appropriately designated. Values associated with quarantined or delayed values are marked with a plus (+) or otherwise appropriately designated. Accordingly, the transaction processor is configured to match values with an asterisk only with messages marked with a plus. It should be appreciated that delayed messages (marked with a plus) may also match with base values (not marked with an asterisk), but non-delayed messages (not marked with a plus) may not be allowed to match with improved values (marked with an asterisk). The quantity associated with a message is shown in parentheses. For example, the message in Ask position 2 is associated with a quantity of 45.

As shown in FIG. 8, a new quarantined order/message 802 (indicated as having been quarantined by the plus sign) is received by the exchange computing system to sell 50 units at value 99. Message 802 matches with the entry at Bid position 2, namely, the 99* which is only available to quarantined messages. The result, illustrated in FIG. 9, is that the object 800 now includes 10 units (60 minus 50) available for purchase at value 99 to quarantined messages.

Figure 9:

A new message 902 is then received by the exchange computing system to sell 11 units at base value 100, with a 99 improved value, as shown in FIG. 9. Because the entry at Bid position 2 is only available to quarantined messages, and new message 902 did not experience a delay (i.e., no plus sign next to message 902), the quantity associated with new message 902 is added to object 800, as shown in FIG. 10. Notably, both the base value 100 and the improved value 99 are reflected in the order book object 800, at Ask positions 2 and 1 respectively. Base value 100 and improved value 99 at Ask positions 2 and 1 respectively are both due to the same message 902, and if one of these values matches, the other of these values is affected. The object data structure accordingly links base and improved values that originate from the same order. For example, the data structure may store information about the location (e.g., in a linked list, via a pointer, etc.) of a linked or related value. As shown in FIG. 10, the 99* at Ask position 1 is linked to "Ask position 2", and the 100 at Ask position 2 is linked to "Ask position 1". The 99* at Ask position 1 and the 100 at Ask position 2 may be accordingly said to be linked orders.

Upon executing a transaction that matches quantity in one order of a linked order, the same quantity is reduced in the other of the linked order. For example, as shown in FIG. 11, the exchange computing system receives message 1102 to buy 6 units at value 100. Message 1102 matches with the entry at Ask position 2. In particular, the match results in reducing the quantity at Ask position 2 by 6 units, e.g., 11 minus 6 equals 5, as shown in FIG. 12. This match also reduces the quantity at Ask position 1 by 6 units to 5, as shown in FIG. 12.

As discussed above, order book modifications are sent to client computers via market data feeds. An exchange computing system implementing the disclosed quarantine system includes asterisk sign (improved values) and plus sign (delayed/quarantined order) information as well. Accordingly, market data subscribers can determine which orders currently on the books (i.e., resting orders available for matching) are improved values that can only match with delayed orders, and which orders are delayed orders. This information can be used by traders to determine what type of orders traders would like to place.

It should be appreciated that generally, traders assume a risk that a desired value that is available/advertised on the books when a message is submitted may no longer be available when that message is ultimately processed by the transaction processor. The quarantine system delays incoming messages that have the quarantine field marked or set. Accordingly, a trader who exercises the quarantine field may assume a slightly greater risk that a desired order will no longer be available (e.g., because it executed/matched with some other order) by the time the trader's delayed order reaches the transaction processor for processing. In response for accepting this increased risk, the trader may be rewarded with a better value (if that desired order is still available when the trader's quarantined order is processed by the transaction processor).

Referring now to FIG. 13, FIG. 13 illustrates a state of object 800 at time t=t0. New messages 1302 and 1304 are received by the exchange computing system at time t=t0. Message 1302 is to buy 3 units at value 99 and includes a quarantine flag, meaning it will be delayed by the quarantine system. Message 1304 is to buy 3 units at value 100. As noted above, the exchange computing system described in the examples associated with FIGS. 8 through 17 includes a quarantine system. The quarantine system, illustrated as a black bar in FIG. 13, prevents or delays message 1302 from modifying the order book until the delay (which may be a fixed amount, or a random, varying amount).

Figure 14:
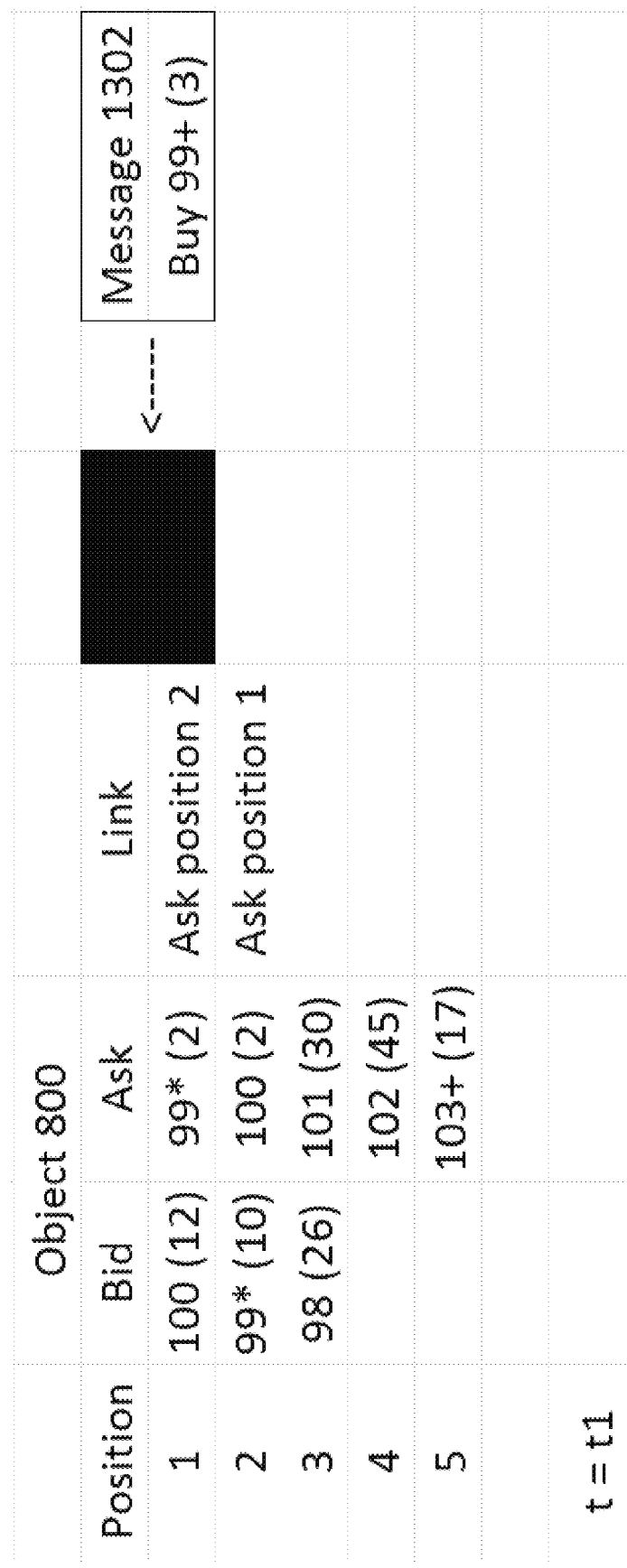

Message 1304 is not delayed and is processed by the transaction processor. Message 1304 matches with the 100 at Ask position 2. Ask position 2 and its linked order Ask position 1 are both accordingly reduced by the quantity associated with message 1304, namely, 3, as shown in FIG. 14, which illustrates the state of object 800 at time t=t1.

The delay associated with message 1302 may expire at time t=t2, as shown by the removal of the black bar (i.e., the delay imposed by the quarantine system) in FIG. 15. Message 1302 matches with Ask position 1, which exhausts all of the quantity associated with Ask position 1 The entries associated with Ask position 1 and its linked order Ask position 1 are both accordingly removed from object 800, as shown in FIG. 16, which illustrates the state of object 800 at time t=t3. The unmatched 1 unit associated with message 1302 is added to the object 800 at Bid position 3, as shown in FIG. 16.

Accordingly, it should be appreciated that message 1302 received a better value/price, namely 99, than message 1304, which matched at value 100. However, message 1304 was matched earlier, at time t=t1, than message 1302, which matched at time t=t3, because message 1302 accepted a delay, i.e., message 1302's quarantine field was set to accept a delay.

It should also be appreciated that the bid queue in FIG. 16 includes two entries associated with value 99 at Bid positions 2 and 3. Typically, an order book object and its associated market data feed aggregates quantities associated with a same value. However, because the 99 at Bid position 2 is an improved value only available to delayed messages, and because the 99 at Bid position 3 is a delayed message that can match with an improved sell value, the data structure associated with object 800 keeps these two entries as separate records, and advertises them as different orders.

FIG. 17 illustrates a state of object 800 at time t=t4. Compared to FIG. 16, object 800 in FIG. 17 has received a message to sell 11 units at value 103, reflected in Ask position 4 in FIG. 17. Again, although Ask positions 3 and 4 both related to the same value, namely, 103, the entries are stored and advertised separately because Ask position 3 experienced a delay (indicated by the plus sign) and can accordingly match with an improved buy price. A buy message 1702 to buy 7 units at value 103 can match with either Ask position 3 or Ask position 4. The priority and/or allocation algorithm executed by the transaction processor may determine which of the entries, Ask position 3 or Ask position 5, matches with message 1702.

As discussed above, a client computer may specify an order that accepts a delay, and also includes two price values, namely, a base value and an improved value. When a message is marked for quarantine, the entire message, including both values, is delayed. The entire order is delayed from reaching the exchange computing system (if the quarantine system is located outside or at the ingress of the exchange computing system) or transaction processor (if the quarantine system is located within the exchange computing system) for a period of time. The imposed delay may be a pre-determined amount of time, e.g., 10 microseconds, for all quarantined messages. Or, alternatively, the quarantine system may randomize the delay period, so that each quarantined/delayed message is delayed by some random amount of time, e.g., randomly selected from a bounded or unbounded range, such as 0 to 10 microseconds, 5 to 15 microseconds, as discussed further herein.

In one embodiment, the quarantine system may impose the same pre-determined delay on all quarantined messages. The delay may be dynamically determined, such as based on current networking/processing conditions. For example, the quarantine system may increase the delay during heavy traffic times. Or, the quarantine system may increase the delay during peak processing (by the hardware matching transaction processor) times. For example, the exchange computing system may experience a high message volume when a market initially opens. During such heavy message times, the quarantine system may impose a higher delay on messages having the quarantine flag set than during other times. For example, referring back to FIG. 6B, the quarantine system may be configured to route quarantined messages via path 616 when the transaction processor latency is high, and may be configured to route quarantined messages via path 610 when the transaction processor latency is low.

In one embodiment, the quarantine system may be coupled to a message splitter, which separates quarantined/delayed messages from non-quarantined/non-delayed messages. The message splitter may, for example, split incoming packages between two physical cables, one for the flag set and the order one for the flag not set. The message splitter may be a very-low latency FPGA-based router.

The delay may be selected from a pre-determined range (fixed or random), and once the minimum delay has expired, the system may then pick transactions from the quarantine based on bandwidth utilization, i.e., to fill in available bandwidth and optimize the consumption thereof. However, if a given transaction is not sent by the time its maximum delay has elapsed, then it may be transmitted regardless of load. This allows the system to dynamically adapt to current utilization and optimize times of low bandwidth utilization by shifting load from times of high bandwidth utilization.

In one embodiment, the quarantine system may impose a delay based on the current processing latency of the transaction processor. As described in U.S. patent application Ser. No. 14/879,614, filed on Oct. 9, 2015 entitled "Systems and Methods for Calculating a Latency of a Transaction Processing System" and U.S. patent application Ser. No. 15/260,707, filed on Sep. 9, 2016 entitled "Message Cancelation Based on Data Transaction Processing System Latency", the entire disclosure of each of which is incorporated by reference herein and relied upon, the exchange computing system may predict or estimate the processing latency the transaction processor will experience. The quarantine system may, in one embodiment, modify the delay time imposed on an incoming quarantined message based on the processing latency being experienced by, or predicted/estimated to be experienced by, the transaction processor.

The delay time value may in some embodiments be randomized via a random number generator. For example, the randomized delay time may be generated based on any number of probability distributions. The chosen distribution may be bounded at the lower end by zero or some other number, and may also be bounded at the upper end, so that packets cannot be held/delayed for an unduly large amount of time. For example, the random delay time may be drawn from a uniform distribution, from a normal distribution curtailed to lower and upper bounds, from a Student's t-distribution with curtailed lower and upper bounds, or in some embodiments from a Poisson distribution with a curtailed upper bound.

In some embodiments, the quarantine system may be implemented on a network package processing apparatus including a processor with limited capacity for floating point mathematics, such as an FPGA (field programmable gate array) with a hardware interface to a data network comprising a physical layer unit and a network link layer unit. Such FPGA embodiments may be preferred for reasons of speed, throughput, cost, and reliability. In such embodiments, it may be advantageous to generate an integer number drawn from a uniform distribution between zero and a predetermined power of two minus one, for example between 0 and 2047. Generating integers may be achieved by a number of fast algorithms well-known in the art, such as a linear congruential pseudorandom number generator. If a non-uniform distribution is desired, the generated random number may be used as an index into a precomputed table of delay time values drawn from a desired probability distribution. In one embodiment, the random number generator uses a counter, truncated to a number of entries, into a lookup table with delay time values drawn from the desired distribution, and increments the counter for each order processed and possibly also for other events, such as thermal noise harvested from the electrical environment, to provide extra entropy.

In some embodiments, e.g., such as those with reference to FIG. 7B, processing and routing the delayed packets may be parallelized. There may be any number of entry gateways that receive order packets. If a packet is not marked for delay, the entry gateways route it immediately to a transaction processor appropriate for the product marked in the packet. If a packet is, however, marked for delay, the entry gateway calculates a delay time value as described herein and marks the packet for delivery at a later time based on the delay time value. The entry gateway may then send the packet to a holding buffer, which may be implemented as a ring buffer or other data structure known in the art. In one embodiment, where an exchange computing system includes multiple transaction processors for different products, there may be one separate buffer per transaction processor. A separate process, which may be implemented by the order engine buffer or by the match engines, then periodically polls the buffer for any packages where the current time is larger than or equal to the delivery time for the packet previously computed. If such a packet is found, it is removed from the buffer, forwarded to the transaction processor, and processed by that transaction processor.

Polling of the buffer may by driven by a number of different methods. In one embodiment, the transaction processor polls the buffer only when it is idle, i.e., not processing incoming orders. This allows the transaction processor to make optimal use of idle time, thus increasing overall throughput capacity. In another embodiment, the transaction processor polls the buffer after every order is processed, whether that order was delayed or was immediately executed. In one preferred embodiment, the transaction processor polls the buffer of delayed orders when it is idle and in addition also at least once per a predetermined time interval, which may be 100 milliseconds, even though it is not idle and has additional orders for immediate execution to process. This may reduce latency for orders for immediate execution but may also ensure that orders to be delayed eventually are executed even during very busy times.

In one embodiment, because randomization may break up sequential processing (e.g., the deterministic behavior typically expected of exchange computing system match engines described above), the systems feeding the buffer, the buffer itself, and the match engine polling from the buffer may not need to offer the guarantee of strictly sequential processing normally needed and/or expected in transaction processors. For example, the algorithm or circuitry polling a ring buffer of delayed orders waiting to enter the match engine may not need to select the order with the earliest time for execution. The polling circuitry may select the first order it encounters or polls that is associated with a time for execution that is earlier than or equal to the current time. The polling circuitry can accordingly simply traverse the ring buffer in a circular fashion until the first hit of an appropriate order, and then resume from that position, instead of needing to have a sorted list of orders or to examine the entire ring buffer before determining which message/order should be retrieved first.

By allowing parallel processing, the risk of data corruption may increase. A quarantine system may accordingly need to lock large data structures to minimize data corruption. Allowing the polling circuitry to simply determine whether a polled order is ready to be processed (e.g., its delay time has elapsed), instead of checking every order before retrieving one for processing, also simplifies the locking circuitry needed for such implementation. The ring buffer data structure may include enable one-order locking by including one atomic lock for each cell in the ring buffer. Because the polling circuitry only has to analyze one order at a time, the system can perform secure parallel processing (e.g., without data corruption) without the need to lock larger (e.g., greater than one order) data structures and thus delaying other processes.

The probability distribution from which the delay time values are drawn may have one or several parameters that may be predetermined or that may be changed dynamically in response to load or other factors. In an embodiment, the parameter changed dynamically may be a simple scaling parameter by which the delay times generated are multiplied, but other embodiments may also vary, for example, the degrees of freedom of a Student's t-distribution or the λ parameter of a Poisson distribution. Some embodiments may increase expected delay time during times of high throughput so as to even out network load on the transaction processors, e.g., transaction processors. Other embodiments may increase expected delay time during times of low throughput since market information may be arriving at a slower rate and thus a short delay may not be sufficiently meaningful.

Other exchange computing systems may insert a delay, such as IEX, which adds a predetermined speed bump of 350 microseconds. The randomized delay described herein may offer a number of benefits over systems implementing a fixed delay. For example, orders arriving all around the same time may be smoothed out over a longer time interval, reducing network and transaction processor congestion, due to a randomized delay for quarantined messages. A randomized delay for quarantined messages may enable easier parallelization of entry gateways and routers. A randomized delay also allows for cost-efficient scaling of processing capacity as well as for increased redundancy. The unpredictability of the exact time a packet will enter the transaction processor, based on a random time delay for messages having the quarantine flag, as well as of the order in which packets will be processed, dis-incentivizes attempts to submit orders to be executed at a precise specific time, thus reducing network congestion. Polling for randomly delayed orders during times when no orders for immediate execution are waiting, smoothes out use of the transaction processor, reduces load peaks, reduces cost for required reserve processing capacity, and allows faster execution for those users who value such fast execution and thus do not use the delay flag. In financial applications, reducing the advantage of speed may motivate participants to invest fewer hardware/speed resources.

Accordingly, a system for generating a delay is hereby disclosed. The delay system may generate a random, or pseudorandom, delay for an incoming message. In an embodiment, the delay value may be based on network conditions. In an embodiment, the delay value may be based on transaction processor load.

Accordingly, the disclosed order type includes additional fields for specifying, e.g., by a trader, whether a message should be quarantined, and/or whether the message should offer a price improvement to other quarantined messages. In one embodiment, the disclosed order type may allow a trader to specify the length of delay he or she is willing to accept. Thus, instead of the quarantine field accepting binary values (e.g., yes, accept a delay, or no, do not accept a delay), the quarantine field allows entry of an amount of time (e.g., 15 microseconds). Or, the quarantine field allows entry of three different values: no delay, small delay, and large delay, where small and large are pre-determined values or configurable by the trader. The quarantine system delays the message for the specified delay, or up to that specified delay. The disclosed order type also allows traders to specify multiple improved values, where the longer the delay experienced by a counter-order, the better the price received by the counter-order. For example, a trader may specify a base value and two improved values, a first improved value and a second improved value, where the second improved value represents a larger improvement over the base value than the first improved value. The first improved value may be available to a counter-message that accepted a small delay, and the second improved value may be available to a counter-message that accepted a large delay. Thus, for a match that occurs between messages submitted by two different users, one of the users may specify the length of the delay, and receive a better price for agreeing to subject his or her message to a longer delay, and the other user may offer better pricing for a counter-message that agrees to a longer delay. The price improvement at which a message matches may accordingly be proportional to the delay experienced by that message. In one embodiment, the quarantine system may determine whether a message receives a price improvement based on a varying threshold delay time. For example, a message may specify an allowable or accepted delay time as a 16-bit integer, or a floating-point number. The quarantine system may then offer a first price improvement to all messages that accepted a first delay time, and may also offer a second, better price improvement to all messages that accepted a second, longer delay time.

In one embodiment, the price improvement specified in a first message, and the amount of delay specified in the quarantine field of a second message, may both be specified in terms of a percentage. The transaction processor may match two messages where the price at which the messages match is linearly proportional to the delay experienced by the quarantined message. The longer the delay experienced by the quarantined message, the better the price received by the quarantined message.

Figure 18:
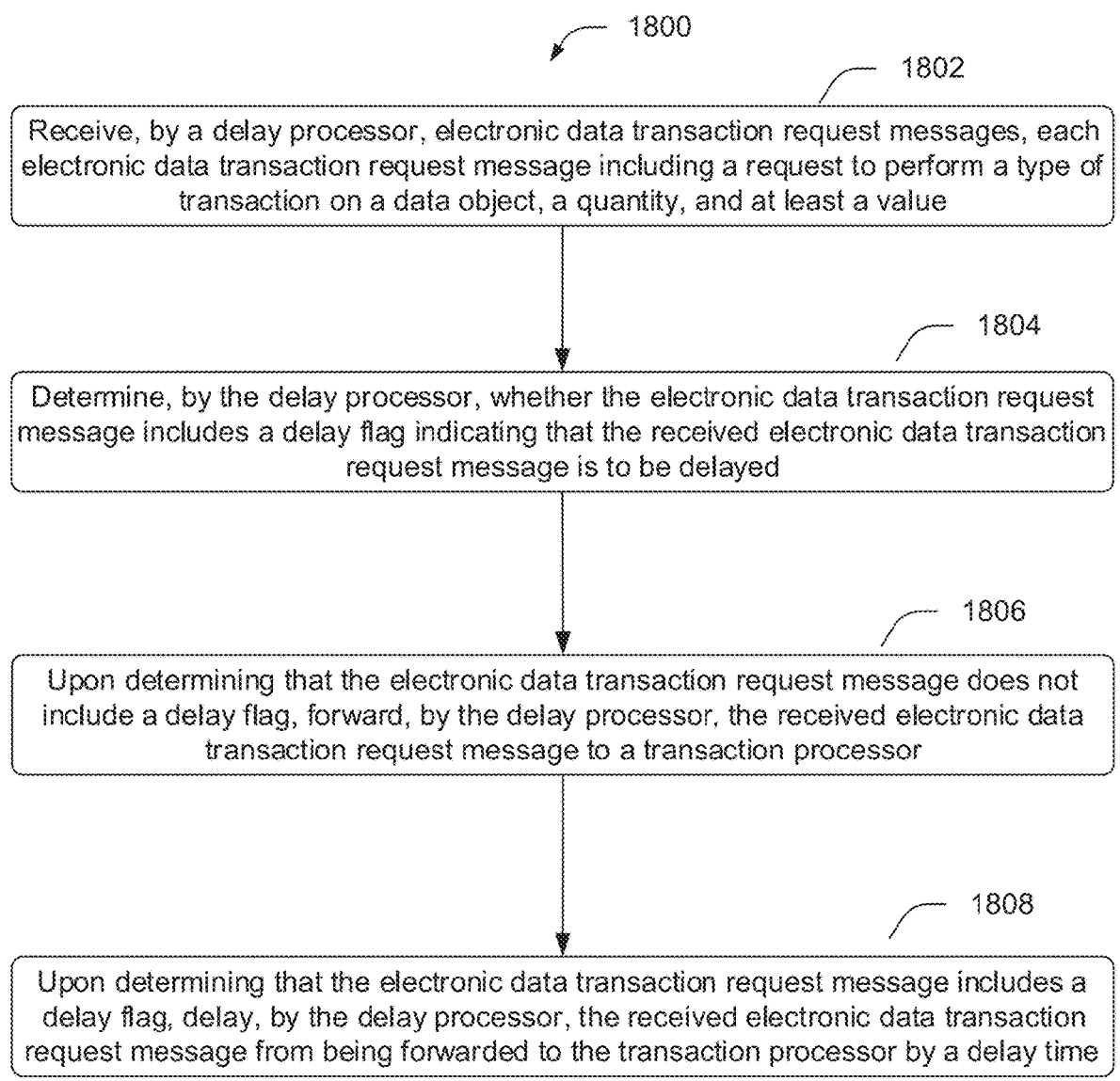
FIG. 18 illustrates an example flowchart for implementing an example exchange computing system in accordance with the disclosed embodiments.

FIG. 18 illustrates an example process 1800 indicating an example method of implementing the disclosed exchange computing system, as may be implemented with computer devices and computer networks, such as those described with respect to FIGS. 1 and 2. Embodiments may involve all, more or fewer actions indicated by the blocks of FIG. 18. The actions may be performed in the order or sequence shown or in a different sequence.

Process 1800 begins with receiving, by a delay processor, electronic data transaction request messages, each electronic data transaction request message including a request to perform a type of transaction on a data object, a quantity, and at least a value, as shown in block 1802.

Process 1800 includes, for each electronic data transaction request message received by the delay processor: determining, by the delay processor, whether the electronic data transaction request message includes a delay flag indicating that the received electronic data transaction request message is to be delayed, as shown in block 1804.

Process 1800 also includes upon determining that the electronic data transaction request message does not include a delay flag, forwarding, by the delay processor, the received electronic data transaction request message to a transaction processor, as shown in block 1806.

Process 1800 also includes, upon determining that the electronic data transaction request message includes a delay flag, delaying, by the delay processor, the received electronic data transaction request message from being forwarded to the transaction processor by a delay time, as shown in block 1808.

In one embodiment, the exchange computing system may require that each incoming packet, e.g., electronic data transaction request message, include a quarantine field that specifies a value corresponding to an accepted delay. A trader not willing to accept a delay may specify zero as the value in the quarantine field. A trader willing to accept a delay may specify a 1 to signal his/her acceptance of the delay or may specify an amount of time corresponding to a delay he or she is willing to accept for that electronic data transaction request message. The quarantine system multiplies the quarantine field value with a random, or pseudo-random, number. The multiplication result is then associated with the respective electronic data transaction request message. Each electronic data transaction request message, along with its multiplication result, is sent to a delay buffer, such as delay buffer 607 described above. As described herein, the delay buffer may be continuously or periodically polled. Each message is retrieved from the delay buffer upon an elapse of the amount of time associated with the multiplication result.

For example, two electronic data transaction request messages A and B may be transmitted to the quarantine system. Electronic data transaction request message A includes a value of 3 in the quarantine field, indicating that electronic data transaction request message A accepts (i.e., the trader submitting electronic data transaction request message A accepts) a delay of 3 microseconds. Electronic data transaction request message B includes a value of zero in the quarantine field, indicating that electronic data transaction request message B should not be subjected to a delay at all. Upon receiving electronic data transaction request messages A and B, the quarantine system may multiply each quarantine field with a pseudorandom number, e.g., 2.67. Accordingly, electronic data transaction request message A is associated with a multiplication result of 8.01 microseconds (2.67*3 microseconds), and electronic data transaction request message B is associated with a multiplication result of 0 microseconds (2.67*0 microseconds). Electronic data transaction request messages A and B are stored in the delay buffer and are retrieved based on their respective multiplication results. Electronic data transaction request message B is retrieved immediately (e.g., upon the first polling of the delay buffer), whereas electronic data transaction request message A is retrieved after the expiration of at least 8.01 microseconds. Thus, electronic data transaction request message B does not experience a delay, due to its quarantine field which specified zero. Such an implementation advantageously allows the quarantine system to process each incoming electronic data transaction request message in the same manner. The quarantine system does not need, in this embodiment, to treat incoming electronic data transaction request messages separately, because each message's quarantine field is multiplied by a random, or pseudorandom, number. Because the quarantine system can process each message in the same way, the quarantine system can more quickly process incoming messages and send them to the delay buffer.

In an embodiment, the exchange computing system may require that each electronic data transaction request message include a non-zero value in the quarantine field. The exchange computing system may require that the quarantine field include a value in a range, e.g., 5 microseconds to 500 microseconds. Thus, each electronic data transaction request message may be required to accept at least a 5 microseconds delay.

Referring back to FIG. 1, the trading network environment shown in FIG. 1 includes exemplary computer devices 114, 116, 118, 120 and 122 which depict different exemplary methods or media by which a computer device may be coupled with the exchange computer system 100 or by which a user may communicate, e.g., send and receive, trade or other information therewith. It should be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 200 described in more detail with respect to FIG. 2, may include a central processor, specifically configured or otherwise, that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An exemplary computer device 114 is shown directly connected to exchange computer system 100, such as via a T1 line, a common local area network (LAN) or other wired and/or wireless medium for connecting computer devices, such as the network 220 shown in FIG. 2 and described with respect thereto. The exemplary computer device 114 is further shown connected to a radio 132. The user of radio 132, which may include a cellular telephone, smart phone, or other wireless proprietary and/or non-proprietary device, may be a trader or exchange employee. The radio user may transmit orders or other information to the exemplary computer device 114 or a user thereof. The user of the exemplary computer device 114, or the exemplary computer device 114 alone and/or autonomously, may then transmit the trade or other information to the exchange computer system 100.

Exemplary computer devices 116 and 118 are coupled with a local area network ("LAN") 124 which may be configured in one or more of the well-known LAN topologies, e.g., star, daisy chain, etc., and may use a variety of different protocols, such as Ethernet, TCP/IP, etc. The exemplary computer devices 116 and 118 may communicate with each other and with other computer and other devices which are coupled with the LAN 124. Computer and other devices may be coupled with the LAN 124 via twisted pair wires, coaxial cable, fiber optics or other wired or wireless media. As shown in FIG. 1, an exemplary wireless personal digital assistant device ("PDA") 122, such as a mobile telephone, tablet based compute device, or other wireless device, may communicate with the LAN 124 and/or the Internet 126 via radio waves, such as via Wi-Fi, Bluetooth and/or a cellular telephone based data communications protocol. PDA 122 may also communicate with exchange computer system 100 via a conventional wireless hub 128.

FIG. 1 also shows the LAN 124 coupled with a wide area network ("WAN") 126 which may be comprised of one or more public or private wired or wireless networks. In one embodiment, the WAN 126 includes the Internet 126. The LAN 124 may include a router to connect LAN 124 to the Internet 126. Exemplary computer device 120 is shown coupled directly to the Internet 126, such as via a modem, DSL line, satellite dish or any other device for connecting a computer device to the Internet 126 via a service provider therefore as is known. LAN 124 and/or WAN 126 may be the same as the network 220 shown in FIG. 2 and described with respect thereto.

Users of the exchange computer system 100 may include one or more market makers 130 which may maintain a market by providing constant bid and offer prices for a derivative or security to the exchange computer system 100, such as via one of the exemplary computer devices depicted. The exchange computer system 100 may also exchange information with other match or trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on a non-transitory computer-readable medium. For example, the exemplary computer device 116 may store computer-executable instructions for receiving order information from a user, transmitting that order information to exchange computer system 100 in electronic messages, extracting the order information from the electronic messages, executing actions relating to the messages, and/or calculating values from characteristics of the extracted order to facilitate matching orders and executing trades. In another example, the exemplary computer device 118 may include computer-executable instructions for receiving market data from exchange computer system 100 and displaying that information to a user.

Numerous additional servers, computers, handheld devices, personal digital assistants, telephones, and other devices may also be connected to exchange computer system 100. Moreover, one skilled in the art will appreciate that the topology shown in FIG. 1 is merely an example and that the components shown in FIG. 1 may include other components not shown and be connected by numerous alternative topologies.

Referring back to FIG. 2, an illustrative embodiment of a general computer system 200 is shown. The computer system 200 can include a set of instructions that can be executed to cause the computer system 200 to perform any one or more of the methods or computer based functions disclosed herein. The computer system 200 may operate as a standalone device or may be connected, e.g., using a network, to other computer systems or peripheral devices. Any of the components discussed above, such as the processor 202, may be a computer system 200 or a component in the computer system 200. The computer system 200 may be specifically configured to implement a match engine, margin processing, payment or clearing function on behalf of an exchange, such as the Chicago Mercantile Exchange, of which the disclosed embodiments are a component thereof.

In a networked deployment, the computer system 200 may operate in the capacity of a server or as a client user computer in a client-server user network environment, or as a peer computer system in a peer-to-peer (or distributed) network environment. The computer system 200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 200 can be implemented using electronic devices that provide voice, video, or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 2, the computer system 200 may include a processor 202, e.g., a central processing unit (CPU), a graphics processing unit (GPU), or both. The processor 202 may be a component in a variety of systems. For example, the processor 202 may be part of a standard personal computer or a workstation. The processor 202 may be one or more general processors, digital signal processors, specifically configured processors, application specific integrated circuits, field programmable gate arrays, servers, networks, digital circuits, analog circuits, combinations thereof, or other now known or later developed devices for analyzing and processing data. The processor 202 may implement a software program, such as code generated manually (i.e., programmed).

The computer system 200 may include a memory 204 that can communicate via a bus 208. The memory 204 may be a main memory, a static memory, or a dynamic memory. The memory 204 may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 204 includes a cache or random access memory for the processor 202. In alternative embodiments, the memory 204 is separate from the processor 202, such as a cache memory of a processor, the system memory, or other memory. The memory 204 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 204 is operable to store instructions executable by the processor 202. The functions, acts or tasks illustrated in the figures or described herein may be performed by the programmed processor 202 executing the instructions 212 stored in the memory 204. The functions, acts or tasks are independent of the particular type of instructions set, storage media, processor or processing strategy and may be performed by software, hardware, integrated circuits, firm-ware, microcode, and the like, operating alone or in combination. Likewise, processing strategies may include multiprocessing, multitasking, parallel processing, and the like.

As shown, the computer system 200 may further include a display unit 214, such as a liquid crystal display (LCD), an organic light emitting diode (OLED), a flat panel display, a solid state display, a cathode ray tube (CRT), a projector, a printer or other now known or later developed display device for outputting determined information. The display 214 may act as an interface for the user to see the functioning of the processor 202, or specifically as an interface with the software stored in the memory 204 or in the drive unit 206.

Additionally, the computer system 200 may include an input device 216 configured to allow a user to interact with any of the components of system 200. The input device 216 may be a number pad, a keyboard, or a cursor control device, such as a mouse, or a joystick, touch screen display, remote control, or any other device operative to interact with the system 200.

In a particular embodiment, as depicted in FIG. 2, the computer system 200 may also include a disk or optical drive unit 206. The disk drive unit 206 may include a computer-readable medium 210 in which one or more sets of instructions 212, e.g., software, can be embedded. Further, the instructions 212 may embody one or more of the methods or logic as described herein. In a particular embodiment, the instructions 212 may reside completely, or at least partially, within the memory 204 and/or within the processor 202 during execution by the computer system 200. The memory 204 and the processor 202 also may include computer-readable media as discussed above.

The present disclosure contemplates a computer-readable medium that includes instructions 212 or receives and executes instructions 212 responsive to a propagated signal, so that a device connected to a network 220 can communicate voice, video, audio, images or any other data over the network 220. Further, the instructions 212 may be transmitted or received over the network 220 via a communication interface 218. The communication interface 218 may be a part of the processor 202 or may be a separate component. The communication interface 218 may be created in software or may be a physical connection in hardware. The communication interface 218 is configured to connect with a network 220, external media, the display 214, or any other components in system 200, or combinations thereof. The connection with the network 220 may be a physical connection, such as a wired Ethernet connection or may be established wirelessly. Likewise, the additional connections with other components of the system 200 may be physical connections or may be established wirelessly.

The network 220 may include wired networks, wireless networks, or combinations thereof. The wireless network may be a cellular telephone network, an 802.11, 802.16, 802.20, or WiMAX network. Further, the network 220 may be a public network, such as the Internet, a private network, such as an intranet, or combinations thereof, and may utilize a variety of networking protocols now available or later developed including, but not limited to, TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated or otherwise specifically configured hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well. Feedback provided to the user can be any form of sensory feedback, e.g., visual feedback, auditory feedback, or tactile feedback. Input from the user can be received in any form, including acoustic, speech, or tactile input.

Embodiments of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

It should be appreciated that the disclosed embodiments may be applicable to other types of messages depending upon the implementation. Further, the messages may comprise one or more data packets, datagrams or other collection of data formatted, arranged configured and/or packaged in a particular one or more protocols, e.g., the FIX protocol, TCP/IP, Ethernet, etc., suitable for transmission via a network 214 as was described, such as the message format and/or protocols described in U.S. Pat. No. 7,831,491 and U.S. Patent Publication No. 2005/0096999 A1, both of which are incorporated by reference herein in their entireties and relied upon. Further, the disclosed message management system may be implemented using an open message standard implementation, such as FIX, FIX Binary, FIX/FAST, or by an exchange-provided API.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the described embodiments should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A system comprising:
a delay buffer coupled with an electronic communications network and a transaction processor and disposed along a data path from a client computer to the transaction processor, the delay buffer operative to temporarily store one or more electronic data transaction request messages; and
a delay processor coupled with the delay buffer, the delay processor configured to cause the system to:
receive, arbitrarily over a period of time, a plurality of electronic data transaction request messages, each electronic data transaction request message including a request to perform a type of transaction on a data object, a quantity, a quarantine flag set or unset by the client computer, and a primary value;

for each electronic data transaction request message of the plurality of the electronic data transaction request messages received by the system:

determine whether the electronic data transaction request message includes the set quarantine flag indicating that the received electronic data transaction request message is to be delayed or the unset quarantine flag indicating that the received electronic data transaction request message is not to be delayed;

upon determination that the electronic data transaction request message includes the unset quarantine flag, forward the received electronic data transaction request message to a transaction processor; and upon determination that the electronic data transaction request message includes the set quarantine flag:

determine an amount of a delay time, within a range having a minimum delay time and a maximum delay time, as a function of a current rate of receipt of the plurality of the electronic data transaction request messages when the electronic data transaction request message including the set quarantine flag was received; and re-route the electronic data transaction request message to the delay buffer to be stored in association with the determined amount of the delay time for subsequent routing to the transaction processor only after the at least the minimum delay time has elapsed to distribute a flow of electronic data transaction request messages to the transaction processor to reduce a magnitude of the electronic data transaction request messages received at any one time.

2. The system of claim 1, wherein the delay processor is further configured to cause the system to:

store each re-routed electronic data transaction request message into the delay buffer in association with the determined amount of the delay time and the maximum delay time;

periodically evaluate each of the stored delayed electronic data transaction request messages to determine whether any of the stored delayed electronic data transaction request messages can be routed to the transaction processor by determining whether the determined delay time associated with any of the stored delayed electronic data transaction request messages has expired;

upon determination that the determined delay time of at least one of the stored delayed electronic data transaction request messages has expired, route the at least one of the stored delayed electronic data transaction request messages to the transaction processor based on network utilization for which the associated determined delay time has expired; and upon determination that the maximum delay time of at least one of the stored delayed electronic data transaction request messages has expired, route the at least one of the stored delayed electronic data transaction request messages for which the maximum delay time has expired to the transaction processor regardless of network utilization.

3. The system of claim 1, wherein the delay processor is further configured to cause the system to, upon determination that the electronic data transaction request message includes the set quarantine flag, delay processing thereof to a later time when the rate of receipt of the plurality of the electronic data transaction request messages is expected to be lower.

4. The system of claim 1, wherein the determined amount of the delay time increases when the current rate of receipt of the plurality of the electronic data transaction request messages increases and wherein the determined amount of the delay time decreases when the current rate of receipt of the plurality of the electronic data transaction request message decreases.

5. The system of claim 1, wherein the delay processor is further configured to cause the system to, upon determination that an electronic data transaction request message includes the set quarantine flag, set a random amount of time as the delay time.

6. The system of claim 1, wherein the delay processor is further configured to cause the system to, upon determination that each of a plurality of electronic data transaction request messages includes the set quarantine flag, set a fixed amount of time as the delay time for each of the plurality of electronic data transaction request messages.

7. The system of claim 1, wherein the delay processor is further configured to cause the system, upon determination that an electronic data transaction request message includes the set quarantine flag, set a varying amount of time as the delay time.

8. The system of claim 1, wherein the delay processor is further configured to cause the system to set the delay time further based on transaction processor latency.

9. The system of claim 1, wherein the delay processor is further configured to cause the system to set the delay time further based on network utilization.

10. The system of claim 1, wherein the transaction processor is coupled to an order book data structure and the transaction processor is configured to:

for each electronic data transaction request message received by the transaction processor:

determine whether the received electronic data transaction request message matches a previously received but unsatisfied electronic data transaction request message stored in the order book data structure;

upon determination that the received electronic data transaction request message matches a previously received but unsatisfied electronic data transaction request message, reduce any portion of the previously received but unsatisfied electronic data transaction request message satisfied by the received electronic data transaction request message; and store in the order book data structure any unsatisfied portion of the received electronic data transaction request message for matching with a subsequently received electronic data transaction request message.

11. The system of claim 1, wherein the system is an exchange computing system, wherein the transaction processor is a hardware matching processor, and wherein the data object represents an electronic order book for a financial instrument traded in the exchange computing system.

12. The system of claim 1, further comprising an order book data structure, wherein values associated with the electronic data transaction request messages are stored in the order book data structure.

13. The system of claim 12, wherein the order book data structure comprises a queue associated with the data object.

14. The system of claim 13, wherein the queue is a first queue storing data related to transactions of a first transaction type, wherein the data object is associated with a second queue storing data related to transactions of a second transaction type, and wherein the second transaction type is counter to the first transaction type.

15. The system of claim 14, wherein the first transaction type is one of relinquish or purchase a first quantity of a financial instrument associated with the data object, and wherein the second transaction type is the other of relinquish or purchase a second quantity of the financial instrument associated with the data object.

16. A computer implemented method comprising:
receiving, arbitrarily over a period of time by a delay processor, a plurality of electronic data transaction request messages via a network coupled therewith, each electronic data transaction request message including a request to perform a type of transaction on a data object, a quantity, a quarantine flag set or unset by a client computer and a primary value;
for each electronic data transaction request message of the plurality of the electronic data transaction request messages received by the delay processor:
determining, by the delay processor, whether the electronic data transaction request message includes a set quarantine flag indicating that the received electronic data transaction request message is to be delayed or an unset quarantine flag indicating that the received electronic data transaction request message is not to be delayed;
upon determining that the electronic data transaction request message includes the unset quarantine flag, forward the received electronic data transaction request message to a transaction processor;
upon determining, by the delay processor, that the electronic data transaction request message includes the set quarantine flag:
determining, by the delay processor, an amount of a delay time, within a range having a minimum delay time and a maximum delay time, as a function of a current rate of receipt of the plurality of the electronic data transaction request messages when the electronic data transaction request message including the set quarantine flag was received; and
re-routing, by the delay processor, the received electronic data transaction request message to a delay buffer, disposed along a data path from the client computer to the transaction processor, to be stored in association with the determined amount of the delay time for subsequent routing to the transaction processor after the delay time has elapsed to distribute a flow of electronic data transaction request messages to the transaction processor to reduce a magnitude of the electronic data transaction request messages received at any one time.

17. The computer implemented method of claim 16, further comprising:
storing, by the delay processor, each re-routed electronic data transaction request message into the delay buffer in association with the determined amount of the delay time and the maximum delay time;
periodically evaluating, by the delay processor, each of the stored delayed electronic data transaction request messages to determine whether any of the stored delayed electronic data transaction request messages can be routed to the transaction processor by determining whether the determined delay time associated with any of the stored delayed electronic data transaction request messages has expired;
upon determination that the determined delay time of at least one of the stored delayed electronic data transaction request messages has expired, routing, by the delay processor, the at least one of the stored delayed electronic data transaction request messages to the transaction processor based on network utilization for which the associated determined delay time has expired; and
upon determination that the maximum delay time of at least one of the stored delayed electronic data transaction request messages has expired, routing, by the delay processor, the at least one of the stored delayed electronic data transaction request messages for which the maximum delay time has expired to the transaction processor regardless of network utilization.

18. The computer implemented method of claim 16, further comprising:
causing, by the delay processor, upon determination that the electronic data transaction request message includes the set quarantine flag, delaying processing thereof to a later time when the rate of receipt of the plurality of the electronic data transaction request messages is expected to be lower.

19. The computer implemented method of claim 16, wherein the determined amount of the delay time increases when the current rate of receipt of the plurality of the electronic data transaction request messages increases and wherein the determined amount of the delay time decreases when the current rate of receipt of the plurality of the electronic data transaction request message decreases.

20. A system comprising:
means for receiving, arbitrarily over a period of time, a plurality of electronic data transaction request messages via a network coupled therewith, each electronic data transaction request message including a request to perform a type of transaction on a data object, a quantity, a quarantine flag set or unset by a client computer and a primary value;
means for determining whether each of the plurality of electronic data transaction request messages includes a set quarantine flag indicating that the received electronic data transaction request message is to be delayed or an unset quarantine flag indicating that the received electronic data transaction request message is not to be delayed;
means for, upon determining that when the electronic data transaction request message includes the unset quarantine flag, forwarding the received electronic data transaction request message to a transaction processor; and
means for, upon determining that the electronic data transaction request message includes the set quarantine flag:
determining an amount of a delay time, within a range having a minimum delay time and a maximum delay time, as a function of a current rate of receipt of the plurality of the electronic data transaction request messages when the electronic data transaction request message including the set quarantine flag was received; and
re-routing the received electronic data transaction request message to a delay buffer, disposed along a data path from the client computer to the transaction processor, to be stored in association with the determined amount of the delay time for subsequent routing to the transaction processor after the delay time has elapsed to distribute a flow of electronic data transaction request messages to the transaction processor to reduce a magnitude of the electronic data transaction request messages received at any one time.

* * * * *